US011966149B1

(12) United States Patent
Sabin

(10) Patent No.: US 11,966,149 B1
(45) Date of Patent: Apr. 23, 2024

(54) ANTI-GLARE APPARATUS AND PROTECTOR AGAINST INCLEMENT WEATHER, WEARABLE CAMERA FOR ACTION CAMERAS AND OTHER PHOTOGRAPHIC DEVICES

(71) Applicant: Robert Sabin, Mill Neck, NY (US)

(72) Inventor: Robert Sabin, Mill Neck, NY (US)

(*) Notice: Subject to any disclaimer, the term of this patent is extended or adjusted under 35 U.S.C. 154(b) by 0 days.

(21) Appl. No.: 18/542,670

(22) Filed: Dec. 16, 2023

Related U.S. Application Data

(63) Continuation-in-part of application No. 18/224,876, filed on Jul. 21, 2023, now Pat. No. 11,899,345.

(51) Int. Cl.
*G03B 17/56* (2021.01)
*F16N 13/04* (2006.01)
*H04M 1/04* (2006.01)
*H04N 23/51* (2023.01)
*H04N 23/53* (2023.01)

(52) U.S. Cl.
CPC ........... *G03B 17/561* (2013.01); *F16N 13/04* (2013.01); *H04M 1/04* (2013.01); *H04N 23/51* (2023.01); *H04N 23/53* (2023.01)

(58) Field of Classification Search
USPC .......................................................... 396/439
See application file for complete search history.

(56) References Cited

U.S. PATENT DOCUMENTS

| 2014/0180449 A1* | 6/2014 | Sung ................. A63B 71/0622 |
| | | 700/91 |
| 2015/0323617 A1* | 11/2015 | Ziarati .................... G01R 33/42 |
| | | 324/318 |
| 2018/0059355 A1* | 3/2018 | Schorman ............. G03B 11/00 |
| 2023/0125775 A1* | 4/2023 | Chen ................... A42B 3/0406 |
| | | 2/422 |

FOREIGN PATENT DOCUMENTS

| CN | 2498621 Y | * | 7/2002 |
| CN | 218917759 U | * | 4/2023 |

* cited by examiner

*Primary Examiner* — Clayton E. LaBalle
*Assistant Examiner* — Warren K Fenwick
(74) *Attorney, Agent, or Firm* — Alfred M. Walker

(57) ABSTRACT

A forward extending hollow glare reducing enclosure blocks glare on smartphone or wearable action camera viewing screens. The glare reducing enclosure totally blocks glare on the display screen in real-time, moment to moment. To protect the camera from weather elements, the camera is inserted in a holding clamp. Optionally, a user-worn headband holds a forward extending clamp and glare preventing enclosure, supporting a wearable action camera spaced apart from the viewer user. The user can record videos and stills during athletic or recreational activities, such as mountain climbing or skateboarding. The smartphone camera or the wearable action camera is activated by hand-controlled Bluetooth/Wi-Fi signals or via voice activation software. The action camera and glare reducing enclosure are positioned whereby the eyeball of the user, in combination with the wearable action camera, and the display screen jointly and simultaneously move, see, and record in any direction together.

19 Claims, 14 Drawing Sheets

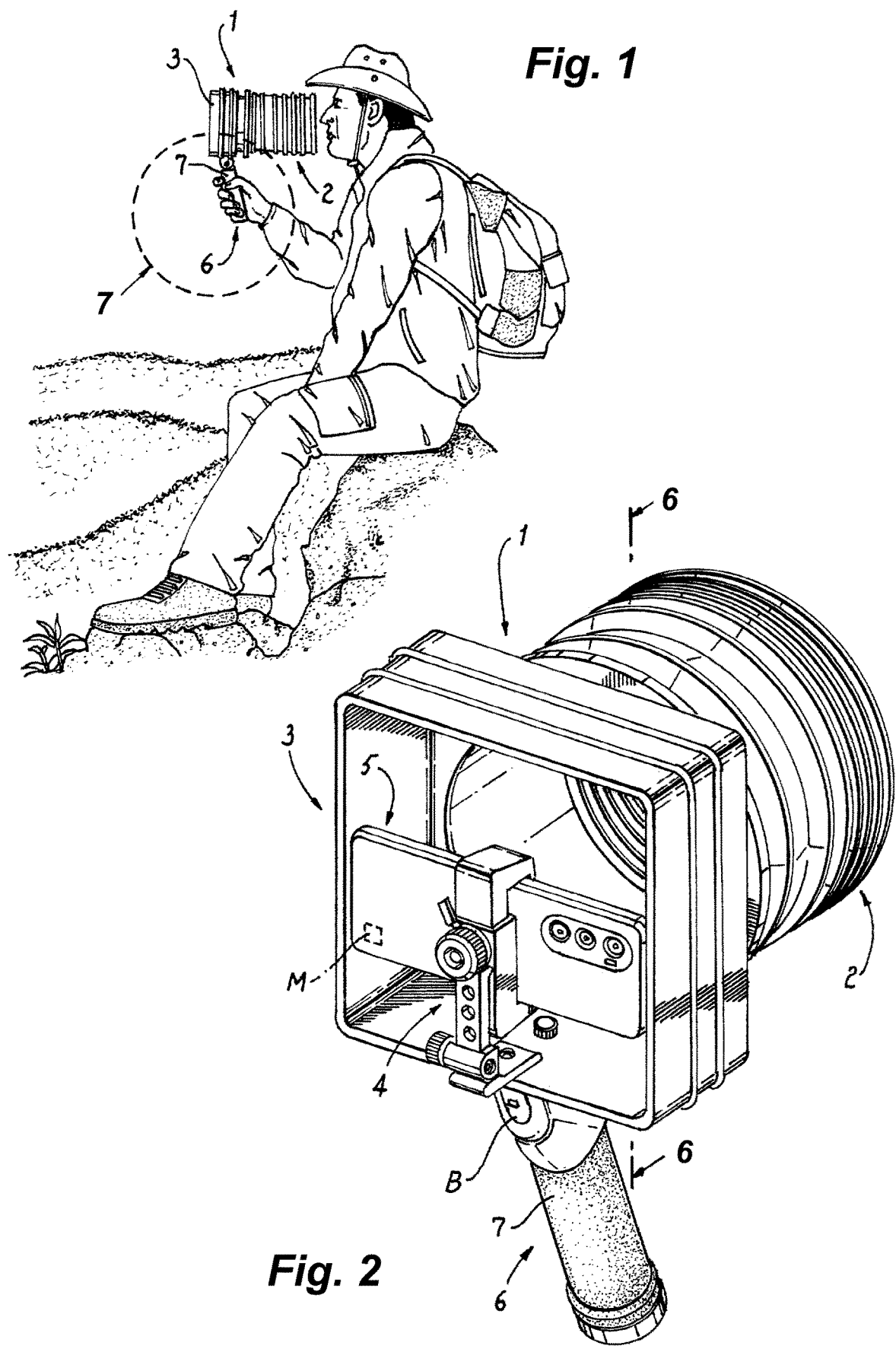

Fig. 4
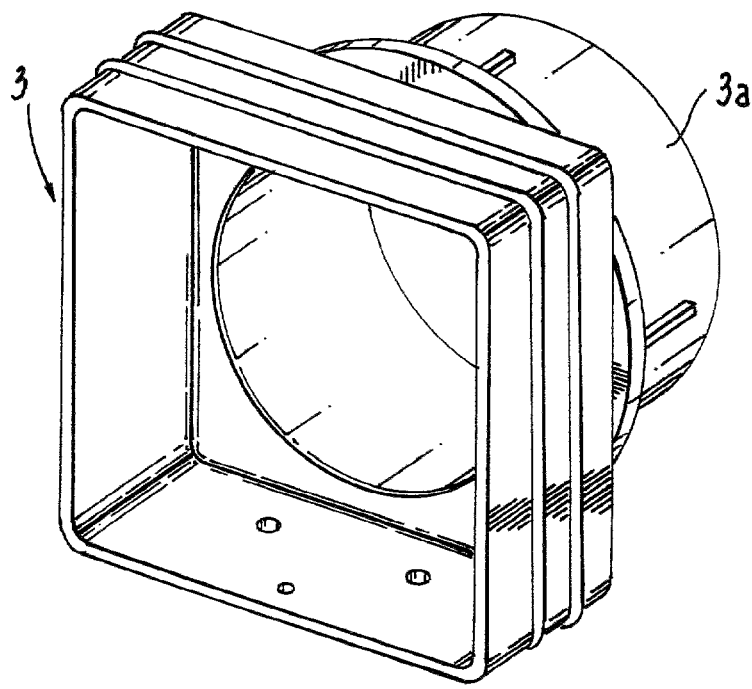
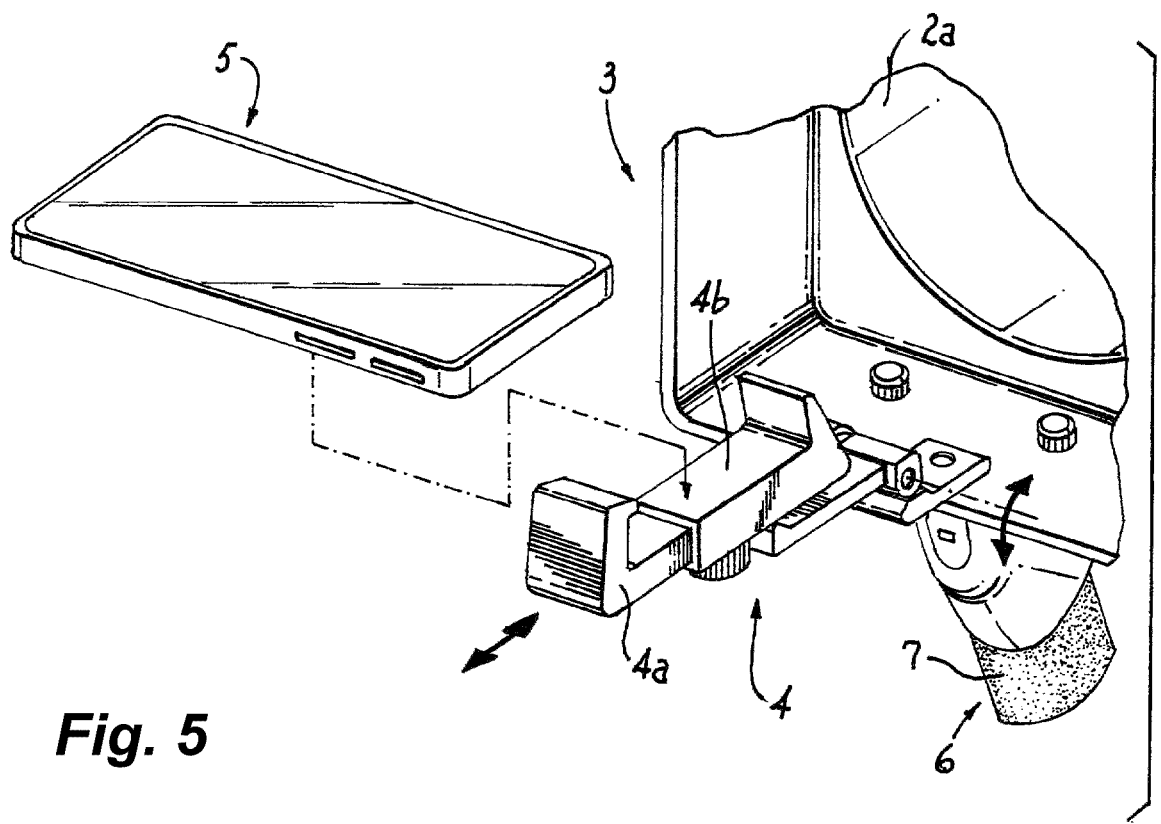
Fig. 5

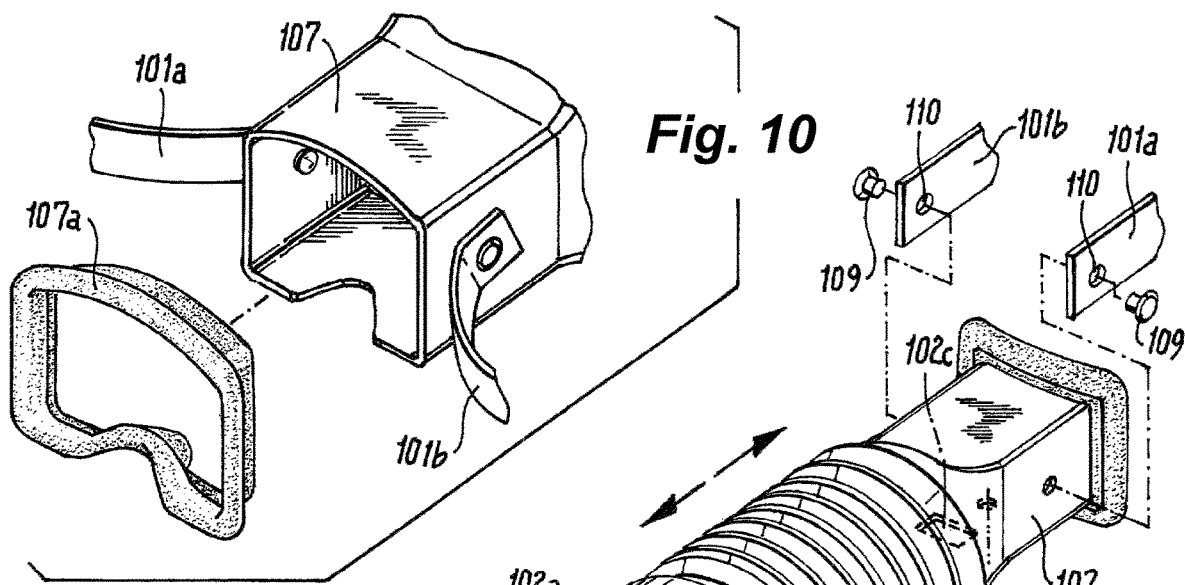
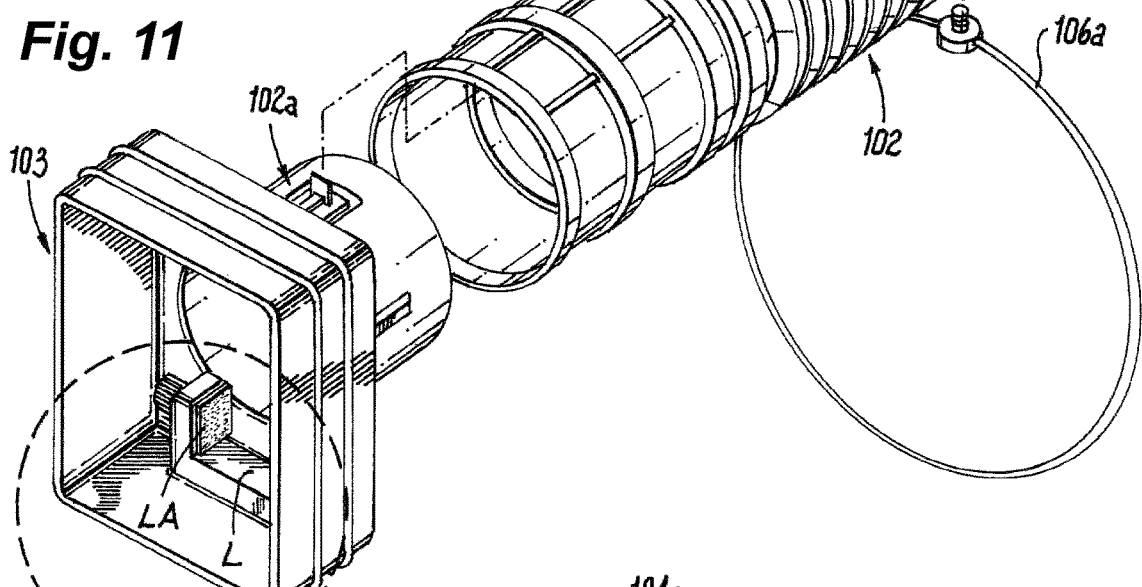
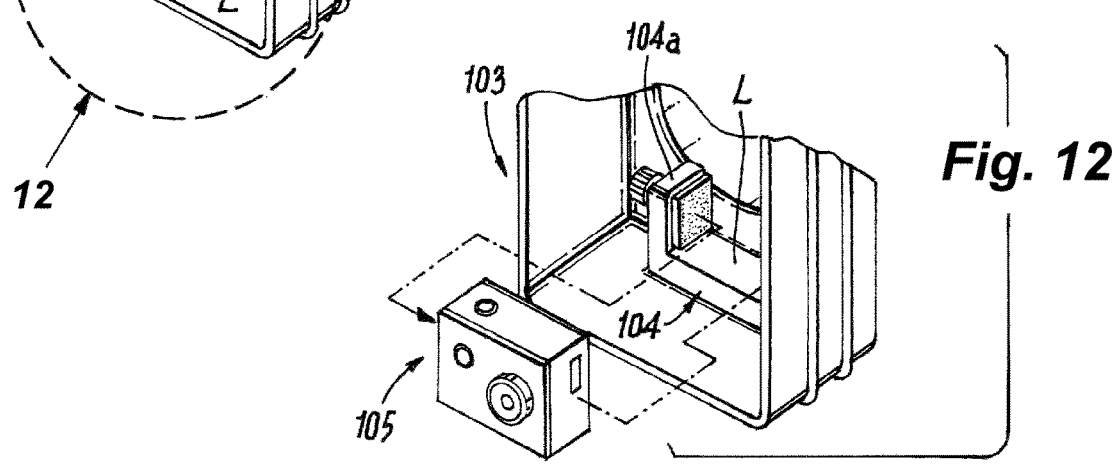

ANTI-GLARE APPARATUS AND PROTECTOR AGAINST INCLEMENT WEATHER, WEARABLE CAMERA FOR ACTION CAMERAS AND OTHER PHOTOGRAPHIC DEVICES

RELATED APPLICATIONS

This application is a continuation-in-part of application Ser. No. 18/224,876, filed Jul. 21, 2023. Applicant claims priority in part from the '876 application under 35 U.S.C. § 120. The '876 application is incorporated by reference herein in its entirety.

FIELD OF THE INVENTION

The present invention relates to an enclosed glare-reducing enclosure, supporting a camera phone therein at a distal end, where the enclosed glare-reducing enclosure is attached to either a handheld support, or optionally attached cantilevered from a user's headband, wherein the eyeball of the user, said wearable action camera, and said display screen jointly move, see, and record in any direction together. The present invention also relates to a wearable camera mount for action cameras and other photographic devices.

BACKGROUND OF THE INVENTION

All references noted below are submitted in an Information Disclosure Statement and are intended to be included in their entirety as if reproduced in full as exhibits herein.

SafetyglassesUSA.com/blog discloses in "what is glare?" that "the International Commission on Illumination (CEI) defines glare as 'visual conditions in which there is excessive contrast or inappropriate distribution of light sources that disturb the observer or limits the ability to distinguish details and objects.' Wikipedia 'glare vision' discloses 'Glare is difficulty of seeing in the presence of bright light such as direct or reflected sunlight or artificial light such as car headlamps at night.' Because of this, some cars include mirrors with automatic and glare functions and in buildings, blinds or louvers are often used to protect occupants. Glare is caused by a significant ratio of luminance between the task (that which is being looked at) and glare sources. Factors such as the angle between the task and the glare source and eye adaption have significant impacts on the experience of glare."

Lawrence Bonk, on Jul. 26, 2022, in "Gadget Review", defines what glare is and why it is bad, disclosing the severe harmful destructive effects of glare relating to camera displays. He discloses, "glare is when sunlight is so bright and obtrusive that it becomes difficult to see anything at all." He also reveals ways to minimize the effects of glare with cameras, and obviously, smartphone screens, which can be improved upon.

The Applicant herein is a long term, avid flower and wildlife photographer who has dealt with glare on cameras and smartphones for over 43 years. Suffice it to say, glare is a severe problem with inadequate remedies.

As noted in "Digital camera sales dropped by 87% by 2010" and in other photography statistics, in 2017, of the 1.2 trillion photos taken, 85% of them were taken with smartphones (as also noted in the Wikipedia definition of "smartphone").

"Screen glare is always a problem but there are ways to reduce it" by Quinton O'Reilly discloses that screen glare is a pervasive problem with a few suggestions to ameliorate screen glare. These suggestions are to adjust positioning, invert colors, turn up brightness, and adjust display contrast.

Another way of reducing glare is disclosed by Kay Ireland, "What to do with glare on my phone" recommends a screen protector. A matte screen protector is recommended; however, the matte screen protector detracts from the quality on the display screen.

Another method disclosed in the art is a blue light filter which helps reduce sun glare on the display. Ruchi Bahri discloses in Mobi Garage "tips to save your eyes from Smartphone screen glare."

All the above methods to reduce screen glare are stop gap measures which do not thoroughly and deeply reduce glare and maintain display quality.

Shannon Cox discloses top ten video holder stabilizers for the iPhone. None of the ten video holder stabilizers do anything to counter glare.

Amazon discloses over 21 smartphone handheld stabilizers, none of which block glare.

There are many companies across the US who manufacture and sell plastic polypropylene, polycarbonate and PVC pipe and related accessories for farming, residential and commercial water drainage and gutter drainage, industrial uses, and more. AQUABARREL® in Gaithersburg, MD is one and RAIN BIRD® in Azusa, CA is another, and GUTTERWORKS®, Barnes City IA is another, Gutter Supply in Mundelein, Il 60060 is another.

FLEX-DRAIN® by RAIN BIRD® discloses, "flexible drainage pipe and fittings. The flexible drainpipe system is a revolutionary landscape drainage system for residential and commercial use and the newest brand of product from RAIN BIRD®. This unique pipe expands and flexes, making it perfect for tight spaces and curvy places."

Downspout tile adapters make the transition from rectangular downspouts or square downspouts to round underground drain tiles. For example, this is shown in the GUTTERWORKS® catalog of many downspout tile adapters and accessories. For example, Applicant herein uses "5×5×4" and 6×6×6 downspout tile adapters in his inventions. The first two numbers are the upper width and length, and the third number is the round pipe diameter below. There are several other downspout tile adapters and other combinations that could be used, such as 6×4×4, Applicant herein has chosen the best ones for efficacy and safety with high visibility for the photographer or daredevil with an action video recording camera.

Another corrugated hub adapter that can be used has 4¾ inches of spatial diameter in width. It fits right in the tube used as an opaque, corrugated, flexible pipe shield. Additionally, a 7-inch diameter snap adapter can be used instead of the 6×6×6 downspout adapter, as alternate embodiments.

While preferred embodiments of the flexible, expandable, opaque pipe are corrugated with folds and being tubular (i.e., cylindrical) in shape, the word "pipe" is not limited to being a "cylindrical" shape. Other geometric configurations for hollow, flexible pipes being square, triangular, polygonal or rectangular in cross section are also useful. In addition, the word "flexible" is not limited to "corrugated" and can apply to any hollow pipe material which is expandable and retractable, with or without corrugations.

Applicant's invention accomplishes virtually opaque, totally blocking glare on the LCD display screen and protecting the camera/smartphone/compact camera and other photographic devices from the elements. The Applicant herein believes the best way to eliminate glare is to eliminate the light striking the LCD or display screen on the smart phone, compact camera, head wearable action camera or other photographic equipment. The camera is surrounded by being mounted adjacent to the distal end of the opaque, corrugated, expandable and retractable pipe or preferably adjacent to the distal end of the downspout to round pipe adapters. The AQUABARREL® and GUTTERWORKS® websites each disclose a plethora of downspout adapters thought to be useful for the present invention. The Applicant herein uses a 2×3×4 flexible downspout adapter from FLEX-DRAIN®, or the flexible 4.25×3 inch BEND-A-DRAIN® "Expandable Small Downspout Adapter", for the wearable camera iteration of the invention. Both iterations have opaque, corrugated, expandable PVC in the middle.

The GOPRO® website defines wearable cameras in the "Wearable Cameras Ultimate 2023 GoPro Guide". While dimensions may vary, a typical GOPRO® camera has dimensions of 2.79-inch width×2.16-inch height×1.32-inch depth. Therefore, the camera is lightweight (5.4 ounces) and compact in size. The GOPRO® website identifies the wearable action camera as "GoPro," which can be provided with a corrugated opaque pipe, which is 9 inches long with a 4-inch round opening on one end followed by the camera at the distal end. The corrugated opaque pipe slips on and attaches to the round part of the downspout adapter by a clamp, screws, or built in tabs. The 9-inch-long iteration expands to 13.5 inches to custom fit the unique eye vision of each separate and distinct person. Clamp, screws, or the built in tabs attach the camera holder to the flexible, corrugated, compressible downspout adapter. The downspout adapter is extremely light weight and made of PVC polyethylene or polypropylene, like the RAIN BIRD® flexy drain material.

The Applicant herein has extensive experience with the corrugated flexible and compressible polyethylene polypropylene downspout adapters, having used it for decades on gutters, downspouts, drainage fields, cesspool leaching fields, and the like. The pipe is robust, light weight, tough, resists extreme cold and extreme heat, and maintains its shape and characteristics handily. The downspout adapters are widely available in the US at places like HOME DEPOT®, LOWES®, TRACTOR SUPPLY®, AMAZON®, agricultural supply houses, and the like. Millions of them are installed throughout the United States on residential and commercial housing, commercial and industrial uses and they are widely used in residential and commercial landscape, landscape, agriculture, and farming. The opaque, corrugated pipe is flexible and compressible, and may be extended toward the user or away from the user.

Wikipedia discloses an overview under the definition of Action Camera. "An action camera or action cam is a digital camera designed for recording action while being immersed in it. Action cameras are therefore typically compact, rugged, and waterproof at the surface level." Wikipedia op cit also discloses a number of companies manufacturing action cameras. "The category is commonly associated with the GOPRO® range of cameras, and many action cameras come with a GOPRO® mount adapter to take advantage of the accessories available for these cameras."

Besides the GOPRO® line, other manufacturers of action cams include. SONY®, GARMIN®, PANASONIC®, TOSHIBA®, POLAROID®, RICOH®, DJI OSMO ACTION®, and more.

GOPRO® discloses on Feb. 16, 2023, "Wearable Cameras: Ultimate 2023 GoPro Guide," point-of-view (POV) wearable camera information. What is a wearable camera? And other information.

GOPRO® op cit. discloses the a few of the best mounts for wearing a "GoPro®" camera. These mounts include hand and wrist straps, chest body mounts, helmet front and side mounts, bite mouth mounts, and underwater floating camera case straps.

GOPRO® under "Mounts" discloses 30 different mounts. Including" Head Strap 2.0," which fits over the head point of view. The B&H PHOTO VIDEO® in Manhattan website has 14 pages of mounts for head wearable action cameras. The Head Strap 2.0 strap is the current state of the art for wearing an action camera on the helmet or head. It absolutely does not allow the eyeball to directly see what the camera sees. At best, it furnishes a point of view from the top of the head.

Among related patents include Chinese Patent No. CN 2044831800 [Yang], which discloses headwear with a holder integrated with clamp arrangement for holding cell phones at eye level, with side curtains extending along visor (see claims 1 and 3-4; FIGS. 1-3). See the head gear mounted camera with draping light glare shields of Chinese Patent CN 204483180 U of Feng Yang that only protect light glare from above or from the sides, unlike the present invention, which prevents light glare from substantially most of 360 degrees around the viewing screen of the camera being viewed.

German patent DE 202006016501U1 of Markus discloses protection against light radiation while handling a digital camera with a glare shield integrated into a cover overhead and serves as a protective cap (see claims 1, 6 and 12; Element 11 in FIGS. 2-4, 6 and 17), unlike the present invention, which prevents light glare from substantially most of 360 degrees around the viewing screen of the camera being viewed.

Markus '501 also discloses draping walls from the peak of a camera user's hat, to shield the hand manipulated camera from sunshine, unlike the present invention, which prevents light glare from substantially most of 360 degrees around the viewing screen of the camera being viewed.

However, Markus '501 also only prevents light from above or from the side of the hand manipulated camera. It does nothing to stop light reflected upward from below, such as reflected upward from a concrete sidewalk or from the surface of a beach waterway below the user's camera.

Amazon.com, in "Wooden Camera LCD Sun Shade for Monitors 6 to 7-inches, Monitor Hood with All-Sides Coverage and Flexible Bottom for Easy Access" describes a sun shade shield hood device for shading sun glare away from a 4-5 or 6-7 inch tablet computer monitor, which is apparently supported by a tripod stand, as opposed to a manually graspable handle or wearable headband device, as in Applicant's claimed subject matter. The wooden camera sunshade hood device is for a video monitor and does not have the ability for the user to look through the lens, to see exactly what is being photographed.

2012/0050144 of Morlock discloses a head-mounted harness that holds position and orientation sensors in fixed position with blinders to prevent sun glare, when using a smartphone camera being held by the head-mounted harness (see claims 1, 8, 11 and 14; Paragraphs [0068], and [0086]), unlike the present invention, which prevents light glare from substantially most of 360 degrees around the viewing screen of the camera being viewed.

2020/0336582 of Garcia-Sanchez discloses headgear with a visor opening for holding a personal communication device, including a camera with the lens positioned below the visor (see FIGS. 6-10; Claims 1-3 and 17-20; Paragraphs [0024]-[0028] and [0058]), unlike the present invention, which prevents light glare from substantially most of 360 degrees around the viewing screen of the camera being viewed.

2012/0175394 of Keune discloses a retaining device (1) for a mobile multimedia terminal (2) wherein head cover (3) comprises a baseball cap (see claim 14). Keune also discloses mounting a cell phone camera from below the visor of a baseball cap, but with no glare shield protection from the sides or below the camera, unlike the present invention, which prevents light glare from substantially most of 360 degrees around the viewing screen of the camera being viewed.

SUMMARY OF THE INVENTION

It is an object of the present invention to provide a glare-reducing enclosure for a camera, wherein the eyeball of the user, said wearable action camera, and said display screen jointly move, see, and record in any direction together.

In one embodiment, an anti-glare, weather-resistant apparatus is disclosed, which blocks display screen glare on smartphone camera viewing screens, on compact head wearable action cameras, and on mirrorless cameras and all other photographic equipment.

An action camera, known as "wearable" in the art, and other photographic equipment mount to aid in precise composition of pictures and video.

In the first embodiment, a hand-held mount for a Wi-Fi/Bluetooth actuator, similar to a camera mount, acts as a hand-held smartphone mount, mounted adjacent to the opaque, flexible, corrugated, bellows-type pipe shield.

Optionally, in a second embodiment a wearable action camera, such as a "GoPro" wearable action camera, is mounted cantilevered from the user's headband and the handheld actuator Wi-Fi/Bluetooth enabled device is mounted below the tubular bellows glare shield (or detached below) for Wi-Fi Bluetooth operation of the wearable action camera mounted outside of the distal end of flexible, opaque bellows glare shield, which is attached to the user's headband, wherein the eyeball of the user, said wearable action camera, and said display screen jointly move, see, and record in any direction together The opaque, anti-glare, weather-resistant corrugated, bellows type expandable or retractable pipe shield blocks display screen glare on the wearable action camera for head mounted camera, or the smartphone camera mounted on a handheld stabilizer smartphone camera viewing screens. The pipe shield totally blocks glare on the display screen of either the smart phone camera or the wearable action camera.

To protect the camera from the weather elements, the smartphone camera or the wearable action camera is inserted in a clamp or other slide-in receptacle of a sturdy camera holder, such as camera holding frame. The blocked glare is 360 degrees from above from the sides and below the shielded viewing field of the user.

The camera holder may be an internal mounting camera holder within a distal end of the opaque tubular corrugated bellows type flexible pipe shield. Optionally, the camera holder can be an exterior camera holding frame which is mounted upon a handheld camera grip, adjacent to the distal end of the opaque tubular bellows type flexible pipe shield. In the action camera head worn embodiment or in the handheld camera embodiments, the pipe shield may be extended via its bellows-type corrugated folds, which are extendable toward the user or away from the user.

In the optional embodiment, a user-worn headband holds a cantilevered frame supporting the wearable action camera, adjacent to the distal end of an opaque tubular bellows type flexible pipe shield, before the eyes of the user, which may optionally include goggles for the user's viewing eyes. The user-worn headband with the opaque pipe shield enables the user to steadily move the user's head from side to side, or up and down, in steady motions, to produce clear wearable action camera videos or still photographs. The user is able to record videos during athletic or recreational activities, such as mountain climbing or skateboarding. The wearable action camera is activated by hand-controlled Bluetooth/Wi-Fi signals or via voice activation software.

Applicant's invention accomplishes totally blocking glare on the display screen of the handheld smartphone camera. To protect the camera from the weather elements, the smartphone camera is inserted in a clamp or other slide-in receptacle of a sturdy camera holding frame.

The camera holding frame is mounted upon a handheld camera grip, adjacent to the distal end of an opaque tubular bellows type flexible pipe shield, such as, but not limited to, a pipe such as manufactured under the tradename of FLEX-DRAIN®. The pipe is extremely lightweight and made out of polyethylene like the RAIN BIRD® flexy drain material. The pipe may be extended via its bellows-type folds, which are extendable toward the user or away from the user. The expanded bellows of the invention allow the photographer to exactly fit his eye prescription to the device by adjusting the compressible pipe in and out.

In an optional embodiment, a user-worn headband holds a cantilevered frame supporting a wearable action camera, such as a head worn "Go Pro" camera, or other wearable action video recording camera, adjacent to the distal end of an opaque, wherein the eyeball of the user, said wearable action camera, and said display screen jointly move, see, and record in any direction together before the eyes of the user, which may optionally include goggles for the user's viewing eyes. The opaque, tubular, flexible bellows pipe shield is also a tubular, expandable bellows screen shield that enables the user to steadily move the user's head from side to side, or up and down, in steady motions, to produce clear action camera videos or still photographs. The user is able to record videos during athletic or recreational activities, such as mountain climbing, skiing, or skateboarding.

Because the embodiment with the user-worn headband will be used in very rigorous sports such as skiing, snowboarding, cycling, skateboarding, skydiving and the like, a safety lasso small diameter cord is provided going from the apparatus around the neck, in a secure but safe release configuration, so that when the apparatus with the wearable action camera falls off the head of the user at 40 mph downhill skiing, or other fast rigorous activity, it is not lost.

In either embodiment, the smartphone camera, or the wearable action camera, is held in the camera holding frame located outside of the distal end of flexible, opaque bellows glare shield, which extends upward from a handheld camera grip or cantilevered forward from the headband base worn around the user's head, so that in either embodiment, the smartphone camera, or action video camera, is held eye level away from the face of the user. The camera grip mount can have access to on/off buttons for remotely activating still or video images on the smartphone camera. The grasping handle has actuating buttons, such as via Wi-Fi or Bluetooth, for operating the smartphone camera remotely with the user's hands.

In a further embodiment for the body worn action camera, the opaque, glare-reducing enclosure is not a flexible tubular corrugated housing, but is a small shroud enclosure of a top wall and two descending side walls holding the action camera adjacent thereto, so that there is a shaded space between the eye of the user and the screen of the body worn action camera to reduce any glare on the viewing screen of the action camera.

Optionally, the smartphone camera or the wearable action camera, can be voice activated, such as via Android Google Access®software or via an Apple iPhone Voice Control®software.

To reduce glare that interferes with viewing images on a smartphone camera screen in direct sunlight, the tubular, opaque, flexible bellows shield blocks sunlight from 360 degrees, whether from above, from the sides, or reflected upward from a lower surface, such as light-colored cement surfaces or from reflecting water below the user. The shield reduces glare, which often makes it visually difficult to see the camera lens in broad daylight, in accordance with the disclosure provided.

In contrast to the prior art patents of Markus '501, Yang '180, and Keune '394, the novel 360-degree protection of the Applicant's tubular, opaque expandable bellows shield, which prevents glare from above and from the sides, it also prevents glare from behind the user, and also from bright light bouncing upward from light reflected up from a concrete sidewalk of from water at a beach toward the digital cellphone camera and therefore does not interfere with the glare protection of Applicant's viewing field toward the smartphone camera, or wearable action camera, where the user's viewing field is protected within the confines of the expandable and retractable tubular bellows glare shield, which keeps the images directed rearward from the smartphone camera or the wearable action camera within the camera holding mount glare-free for the user's viewing field.

In order for the invention to work, the user must survive the use and not be injured because of lack of visibility. Therefore, in order to allow the user to see forward for safety reasons, a top portion of the inside of the tubular, opaque, flexible bellows shield must be unencumbered, so that the user can view the viewing area above the projected screen produced images from the smartphone camera or wearable action camera. Therefore, the viewing area is about double the size of the viewing screen alone.

Therefore, in general, the present invention is an apparatus/device for reducing glare in, and protecting, a camera against weather during use thereof. The apparatus includes:
  a) a camera holder, which may optionally be an interior mount within an opaque, flexible compressible pipe shield, or may be an exterior mounted camera holding frame having a front opening and a rear opening, and located adjacent to the distal end of the opaque flexible compressible pipe shield;
  b) wherein the camera holder has a clamp for supporting the camera either within the distal end of the opaque flexible compressible pipe shield, or within the camera holding frame located outside and adjacent to the distal end of the opaque flexible, compressible pipe shield, where the camera is located within the frame between the front and rear openings of the camera holding frame, or the camera is located in an internal mount located inside at the distal end of the opaque, flexible, compressible pipe shield thereof. The rear opening is adapted for accommodating a user to utilize the camera to photograph an object appearing on a viewing screen of the camera through the proximal rear opening of the frame.

The opaque, flexible and compressible pipe shield is attached at a distal end thereof to the opening of the camera holder, for reducing glare in the camera coming from all sides, while allowing the user to watch the viewing screen on the camera through a proximate end of the flexible pipe shield, and a viewing field extends from the proximate end of the pipe shield. The viewing field includes both the viewing screen of the camera and an unobstructed viewing field surrounding the camera, so that the user has unobstructed views as the user moves forward while using the glare reducing apparatus/device.

The opaque flexible, compressible pipe shield is both expandable and compressible and is preferably corrugated. For example, it may be an opaque corrugated flexible and compressible polyethylene polypropylene downspout adapted for use with the camera.

The glare reducing apparatus may have a downwardly extending handle enabling a user to hold the frame while using said camera, such as where the handle incorporates a camera grip adjacent said distal end of said of the opaque, flexible, compressible pipe shield. The camera grip may include Wi-Fi/Bluetooth capability to activate taking still and video images with a smartphone camera.

In another embodiment, the frame and opaque, flexible, compressible pipe shield are mounted on a headband, a goggles or a scuba/snorkeling mask, with a wearable action camera, which may have a microphone for voice activation of the Wi-Fi/Bluetooth capability, and for taking video. The wearable action camera may be, but is not limited to, a GoPro® brand action camera, or a smartphone capable of taking moving video images.

In a preferred alternate embodiment, an apparatus is provided for supporting and using a body worn action camera during physical activity of a user comprising the following:
  a) a telescoping member mounted on and extending from an article adapted to be worn on the head of the user, such as a goggles, helmet or head band;
  b) the aforesaid telescoping member comprising an arm having a proximal end thereof attached to the article worn on the head of the user, and a distal end on which the camera is attached;
  c) the aforesaid arm comprising a cantilevered extension attached at a first end to the article worn on the head of the user, and a second end adjustably attached a clamp mounted on a second, free end of the aforementioned cantilevered extension;
  d) the clamp configured to support the camera with a viewing screen thereof facing the article worn on the head of the user, whereby the user has a clear view of the camera screen, wherein the screen displays an area being captured by the camera; and
  e) a longitudinally and axially extending opaque hollow enclosure surrounding the viewing screen of the camera having flared top, bottom and side walls shielding the camera's viewing screen from direct sun glare, so that there is a shaded space between the eyes of the user and the viewing screen of the camera;
  f) whereby an eyeball of the user, in combination together with the wearable action camera, and its display screen jointly and simultaneously move, see, and record in any direction together.

The camera can also be part of a smartphone or can be a wearable action camera, where the body worn action camera is a submersible, waterproof action camera. The aforementioned telescoping member, clamp and opaque hollow enclosure surrounding the viewing screen of the camera are submersible and waterproof, whereby the eyeball of the user, in combination with the aforementioned submersible, waterproof wearable action camera, and the aforementioned display screen jointly and simultaneously move, see, and record in any direction together below the surface under water.

In a further optional embodiment, an apparatus is provided for supporting and using a body worn action camera during physical activity of a user including:
i) a telescoping member mounted on and extending from an article adapted to be worn on the head of the user;
ii) the telescoping member comprising an arm having a proximal end thereof attached to the article, and a distal end on which the camera is attached;
iii) the arm comprising a first tube threadedly attached at a first end to the article and a second end adjustably attached to one leg of an elbow, a second tube have a first end thereof adjustably attached to a second leg of the elbow, and a clamp mounted on a second, free end of the second tube;
iv) the clamp comprising a base and a pair of spaced side walls extending up from opposite ends of the base, and configured to support between the side walls the camera with a viewing screen thereof facing the article whereby the user has a clear view of the screen, the screen displaying an area being captured by the camera; and,
v) a truncated, pyramidal shroud enclosure surrounding the viewing screen of the camera having flared top, bottom and side walls shielding the viewing screen from direct sun glare, so that there is a shaded space between the eyes of the user and the viewing screen of the camera;
vi) whereby an eyeball of the user, in combination with the wearable action camera, and the display screen of the wearable action camera jointly and simultaneously move, see, and record in any direction together.

The aforementioned elbow is comprised of a hollow tube to receive the first and second tubes, the hollow tube having spaced apertures corresponding with openings in the first and second for using spring loaded, male positioning members on the first and second tubes, for engaging selected spaced apertures in the hollow tube for locating the camera to a position desired by the user.

The head worn articles may consist of goggles worn during certain sporting activities, in which the first tube is threadedly attached to the goggles in a threaded recess in a corner of the goggles located on one side of the goggles, or in which the first tube is threadedly attached to the goggles in a threaded recess in a top frame of the goggles located above the goggles.

Alternatively, the head worn article may consist of a helmet adapted to be worn by the user, in which the first tube is threadedly attached to the helmet using a frictional hinge located on a side of the helmet allowing rotation of the first tube for quickly lowering or raising the camera by the user while engaging in a physical activity.

The present invention may also optionally include a method for supporting and using a body worn action camera during physical activity of a user comprising the steps of:
mounting and extending an arm of a telescoping member on and from an article worn on the head of the user;
attaching a proximal end of the arm of the telescoping member to the article;
attaching the camera to a distal end of the arm;
the arm comprising a first tube threadedly attached at a first end thereof to the article and a second end thereof adjustably attached to one leg of an elbow, and a second tube having a first end thereof adjustably attached to a second leg of the elbow;
mounting a clamp on a second, free end of the second tube;
providing the clamp with a base and a pair of spaced side walls extending up from opposite ends of the base, and configuring the clamp to support between the side walls the camera with a viewing screen thereof facing the article whereby the user has a clear view of the screen, the screen displaying an area being captured by the camera; placing a truncated, pyramidal shroud enclosure around the viewing screen of the camera, the shroud enclosure having flared top, bottom and side walls shielding the viewing screen from direct sun glare, so that there is a shaded space between the eyes of the user and the viewing screen of the camera; and the user engaging in a sports activity while wearing the action camera, watching the screen in real time, and adjusting the position of the action camera while in motion.

In the method, the elbow may be a hollow tube to receive the first and second tubes, the hollow tube having spaced apertures corresponding with spaced openings in the first and second tube for using spring loaded, male positioning members on the first and second tubes, for engaging selected spaced apertures in the hollow tube for locating the camera to a position desired by the user.

The method may include the user's use of wearing goggles, a helmet or a headband worn during certain sporting activities, in which the first tube is threadedly attached to the goggles in a threaded recess in a corner of the goggles located on one side of the goggles or in which the first tube is threadedly attached to the goggles in a threaded recess in a top frame of the goggles located above the goggles.

The method may also include the use of a frictional hinge on the helmet in which the first tube is threadedly attached to the helmet using the frictional hinge located on a side of the helmet, so that the user can rotate the first tube for quickly lowering or raising the camera while engaging in the sports activity.

The method for supporting and using a body worn action camera during physical activity of a user may also use a submersible, waterproof action camera, where the telescoping member, the clamp and the truncated, pyramidal shroud enclosure surrounding the viewing screen of the camera are submersible and waterproof.

In that water-submersible situation, the eyeball of the user, the submersible, waterproof wearable action camera, and the display screen jointly and simultaneously move, see, and record in any direction together below the surface under water.

BRIEF DESCRIPTION OF THE DRAWINGS

The present invention can best be understood in connection with the accompanying drawings. It is noted that the invention is not limited to the precise embodiments shown in the following drawings, in which:

FIG. 1 is a perspective view of a hiker having an opaque flexible corrugated compressible bellows-type pipe shield in front of the hiker, with the opaque flexible corrugated compressible bellows-type pipe shield having outside its distal end a camera holder, such as a frame holding a smartphone camera, with a grasping handle of a camera grip provided beneath the smartphone camera, wherein the grasping handle has actuating buttons, such as Wi-Fi or Bluetooth, for operating the smartphone camera remotely with the user's hands. Optionally the smartphone camera can be voice activated, such as via Android Google Access®software or via an Apple iPhone Voice Control®software.

FIG. 2 is a close-up front view, showing the flexible, opaque, compressible, corrugated, bellows type glare pipe shield, adjacent to a frame holding the smartphone camera upon a hand operable camera grip post when the smartphone camera images are viewed by a user from the opposite side of the flexible, opaque, compressible, corrugated bellows glare pipe shield.

FIG. 4 is a close-up detail view of the camera holding frame, enclosed adjacent to the distal end of the flexible, opaque compressible, corrugated bellows glare pipe shield.

FIG. 5 is a close-up detail view, showing by the directional arrow the insertion of the smartphone camera within the clamp or other side-in receptacle of the camera holding frame of FIG. 4.

FIG. 6 also shows a safety feature, shown from the user's viewpoint, looking into the flexible opaque bellows pipe glare-reducing shield, but showing the division of the user's viewing filed separated into three parts, namely an unencumbered viewing area through and outside of the viewing field, a middle layer for the smartphone camera and its built-in viewing screen, and a smaller unencumbered area under the smartphone camera, also for the view to look therethrough and outside of the viewing field.

FIG. 9 also shows a lasso-type tether to protect the camera from being lost if it is dislodged from the clamp of the distal frame. The tether is attached conveniently to the user's headband, or other wearable garment.

FIG. 10 shows close up details of the cushion of the goggles at the proximal end of the hollow pipe shield, and portions of the headband straps for the head worn glare-reducing shield of FIGS. 8 and 9 from the front distal end showing optional viewing by the user using goggles to protect the user's eyes while traveling fast and recording a continuous video of what the user sees in the camera screen while moving fast.

FIG. 11 is a front exploded view, showing the components of the flexible, opaque bellows glare-reducing shield and camera holding frame of FIGS. 8-10 with a wearable action camera positioned therein.

FIG. 12 is a close-up detail view of a corner of the wearable action camera holding frame of FIGS. 8-10, showing the locking elements of a clamp within the frame for securely holding the wearable action camera in place.

FIG. 14 also shows an action head mounted camera, such as a "GoPro" camera, or the like, mounted on a ledge outside of the circular field of view of 3½ inches, so that when positioned on the ledge, the camera screen is visible in the lower sector of the 3.5 inch circular viewing field, but that the top of the action camera still leaves a wide open viewing area that is 2.1 inches in height, to provide the user/viewer with an unobstructed view of a sector of the circular viewing area above the top of the "GoPro" camera's display screen in real-time, moment to moment. There are dozens of other wearable mounts by major manufacturers and independent manufactures who manufacture wearable mounts for action cameras which do not allow the photographer to see exactly what he is getting. Examples are the chest mounts and arm mounts.

The colossal advantage of the present invention is that the photographer can compose their pictures or video exactly the way he wants, exactly the way it is, viewing the exact precise scene or person.

When larger diameter pipe shields are used, then the wide-open viewing area will be more than the minimally safe open viewing area of 2.5 inches in height. For example, a connector piece for a 4-inch diameter pipe can have a 4.5-inch diameter at a larger flared opening, so that the unobstructed view above the top of the "GoPro" camera will be 3.1 inches in height, instead of 2.1 inches in height in the aforementioned 3.5-inch circular pipe.

Figure 15:
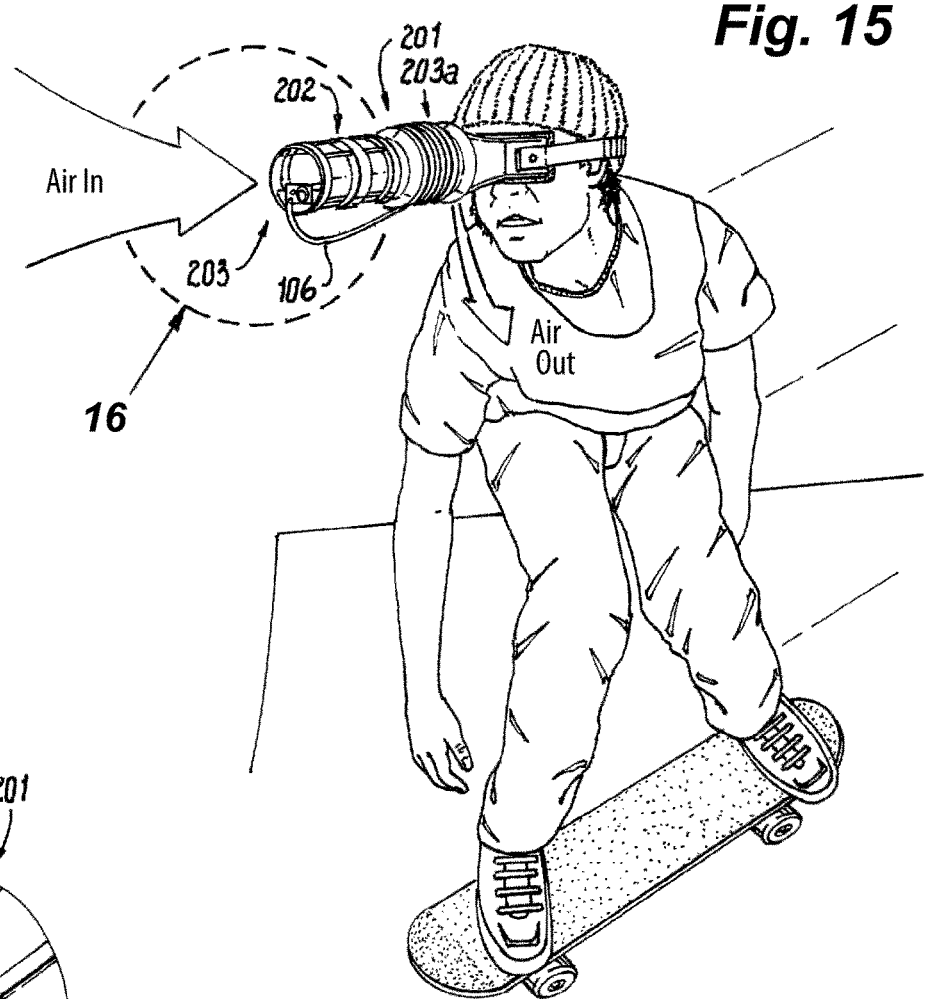

FIG. 15 is a perspective view of an alternate embodiment of a user conducting an on-going activity, such as skateboarding, user using the flexible, opaque bellows glare-reducing shield, having the wearable action camera being held within the distal end of the flexible, tubular, bellows-type corrugated pipe shield, while the skateboarder is moving on a skateboard and taking live action videos with the smartphone camera. The wearable action camera is activated for video imagery, prior to the activity and allowed to video until the activity is ceased. The video capturing can be controlled remotely via Wi-Fi or Bluetooth, with an activation finger operable button on the support post for the wearable action camera and glare-reducing reducing shield. Optionally the video imagery can be captured via voice commands. FIG. 15 also shows an air vent at the bottom of the tubular pipe shield to vent out fast incoming bursts of air while the user is traveling fast in a rigorous activity, such as skateboarding or skiing. FIG. 15 also shows that the pipe shield can be made of variable sections of corrugations to increase or decrease the length of the pipe shield.

Figure 16:
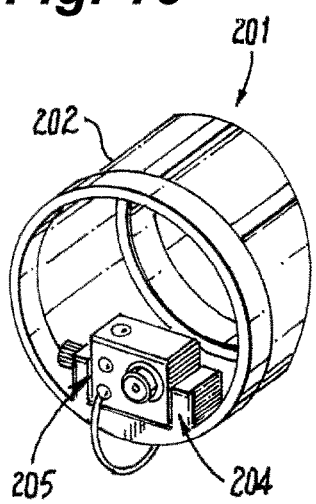

FIG. 16 is a close-up detailed view of the installation of the wearable action camera, located in the distal end of the tubular pipe shield, as shown in FIG. 15, in a skateboarding activity.

Figure 17:
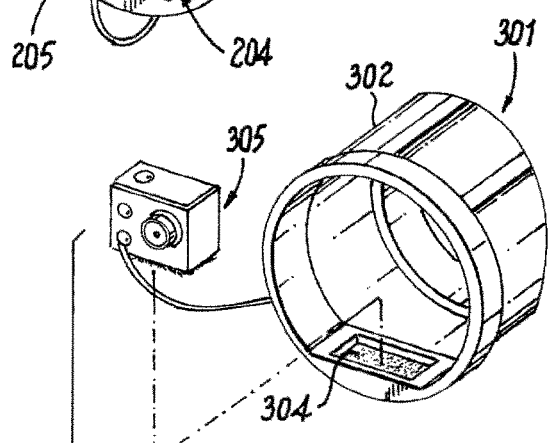

FIG. 17 is a close-up detailed view of an alternate embodiment, where the installation of the wearable action camera is located in the distal end of the tubular pipe shield, as shown in FIG. 15, in a skateboarding activity. But in FIG. 17, the wearable action camera is held in place by a simple fastener, such as a hook and loop fastener (i.e., VELCRO®), for less rigorous, slower activities, than in faster activities such as skateboarding or skiing, shown in FIG. 15.

Figure 18:
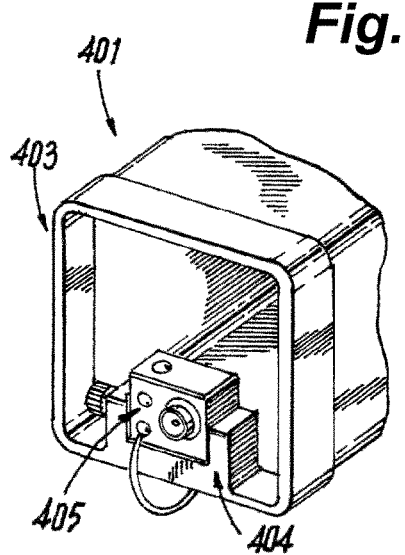

FIG. 18 is an alternate embodiment, where the flexible pipe shield has a noncylindrical cross section, such as a square cross section or other geometric cross-sectional shape.

Figure 19:
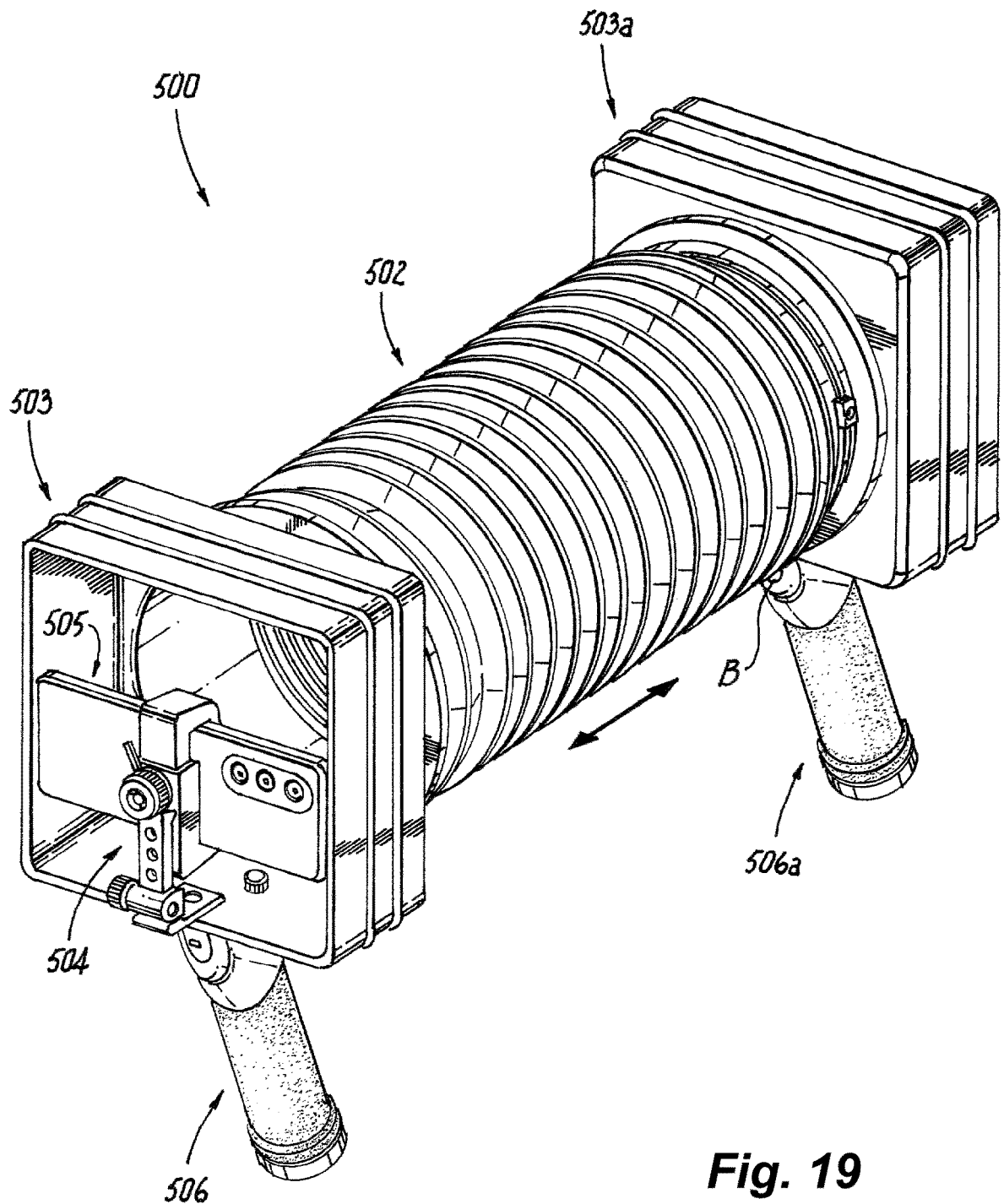

FIG. 19 is an alternate embodiment for using the handheld embodiment of FIGS. 1-7 herein, where the user wants to take a close-up photograph or video of a skittish or poisonous animal, such as a butterfly or snake. Therefore, in a removably attachable handle, such as a camera grip, with a Bluetooth camera activation button is provided at the proximal end of the handheld glare reducing apparatus, spaced apart from the front of the apparatus, near the skittish or poisonous animal. While FIG. 19 shows the auxiliary proximal handle (such as a camera grip), near the body of the user, and the original distal handle (such as a camera grip), it is assumed that the device could have one or both handles either permanently attached or removably attached.

Figure 20:
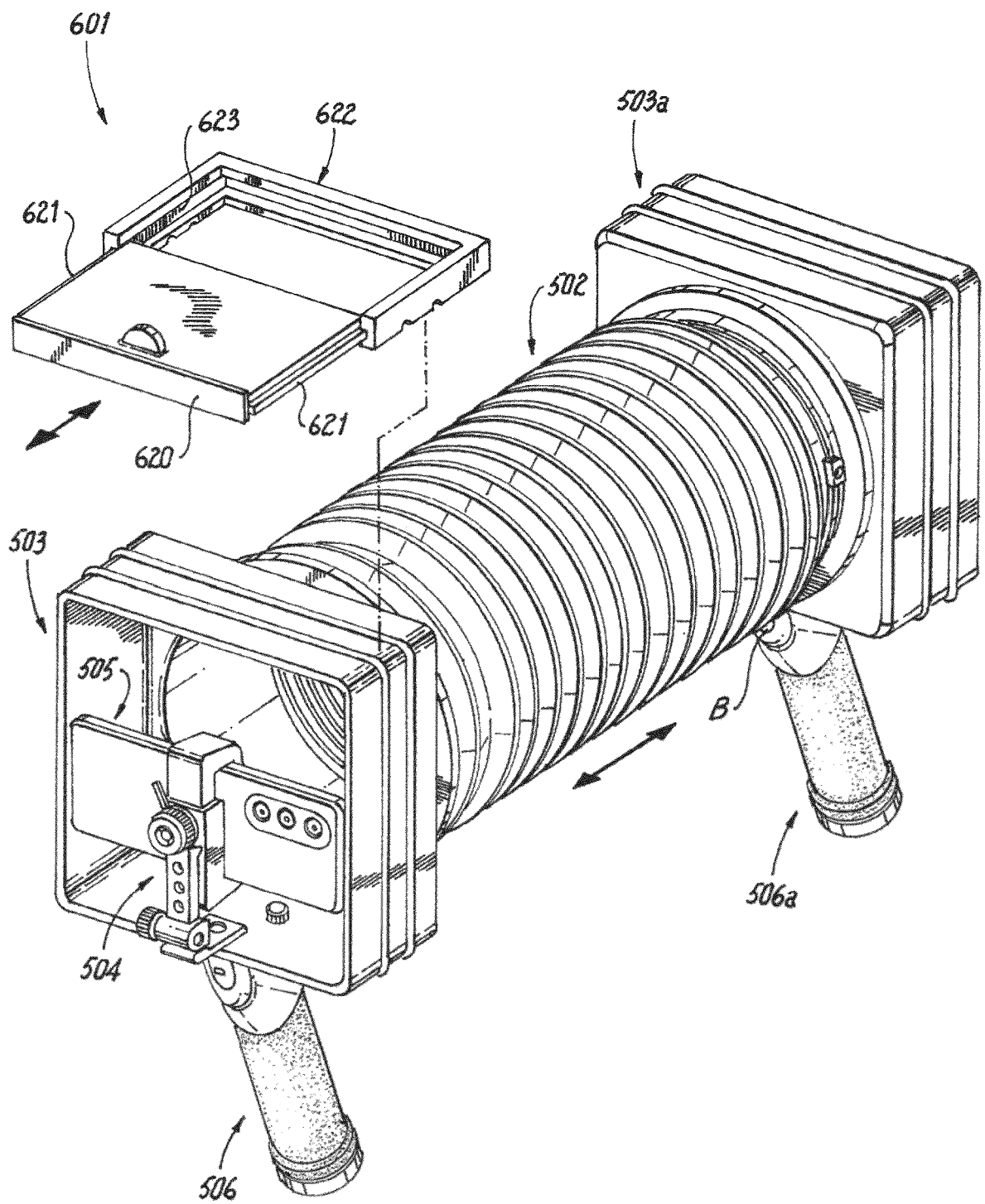

FIG. 20 is a perspective view of an auxiliary slidable, pivotable visor that can slide forward of the camera to block any direct sunlight near the location of the camera at the distal end of the opaque, flexible, compressible pipe shield, shown mounted upon the embodiment shown in FIG. 19.

Figure 21:
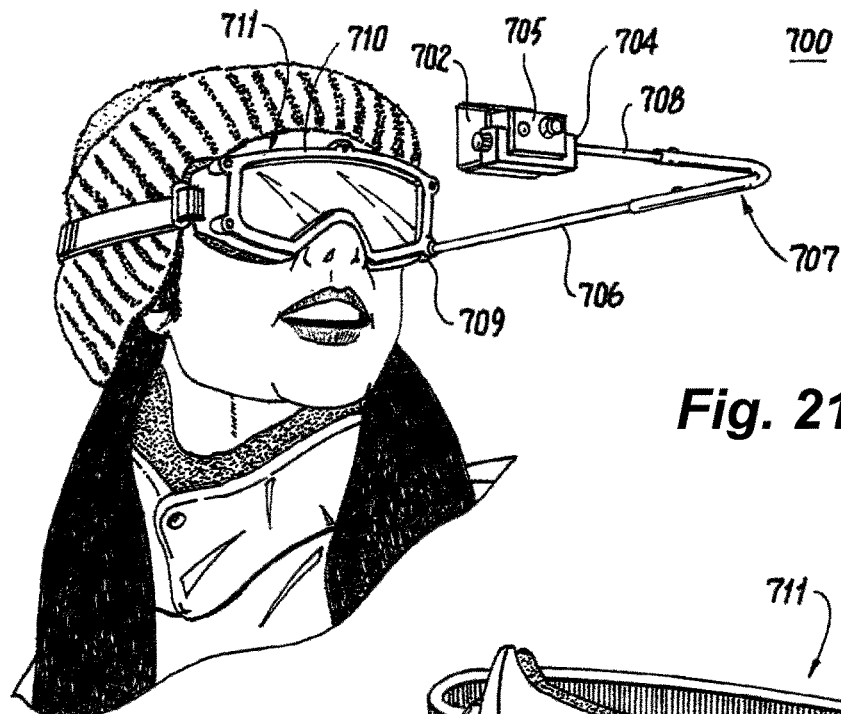

FIG. 21 is a close-up perspective view of a head-mounted action camera worn by a user, such as a skier wearing goggles, wherein the action camera is supported on the side of the goggles, by a telescopic arm which extends from a receiver located on the side of the goggles. The telescopic arm is provided with a clamp at a distal end thereof, to hold the action camera for viewing the viewing screen thereof. The action camera is also provided behind and adjacent to a small truncated pyramidal shroud enclosure of flared walls including a top wall, bottom wall and two descending side walls shielding the clamp-mounted action camera from direct sun glare, so that there is a shaded space between the eye of the user and the screen of the body worn action camera to reduce any glare on the viewing screen of the action camera, wherein the eyeball of the user, in combination with the wearable action camera, and the display screen jointly move, see, and record in any direction together.

Figure 22:
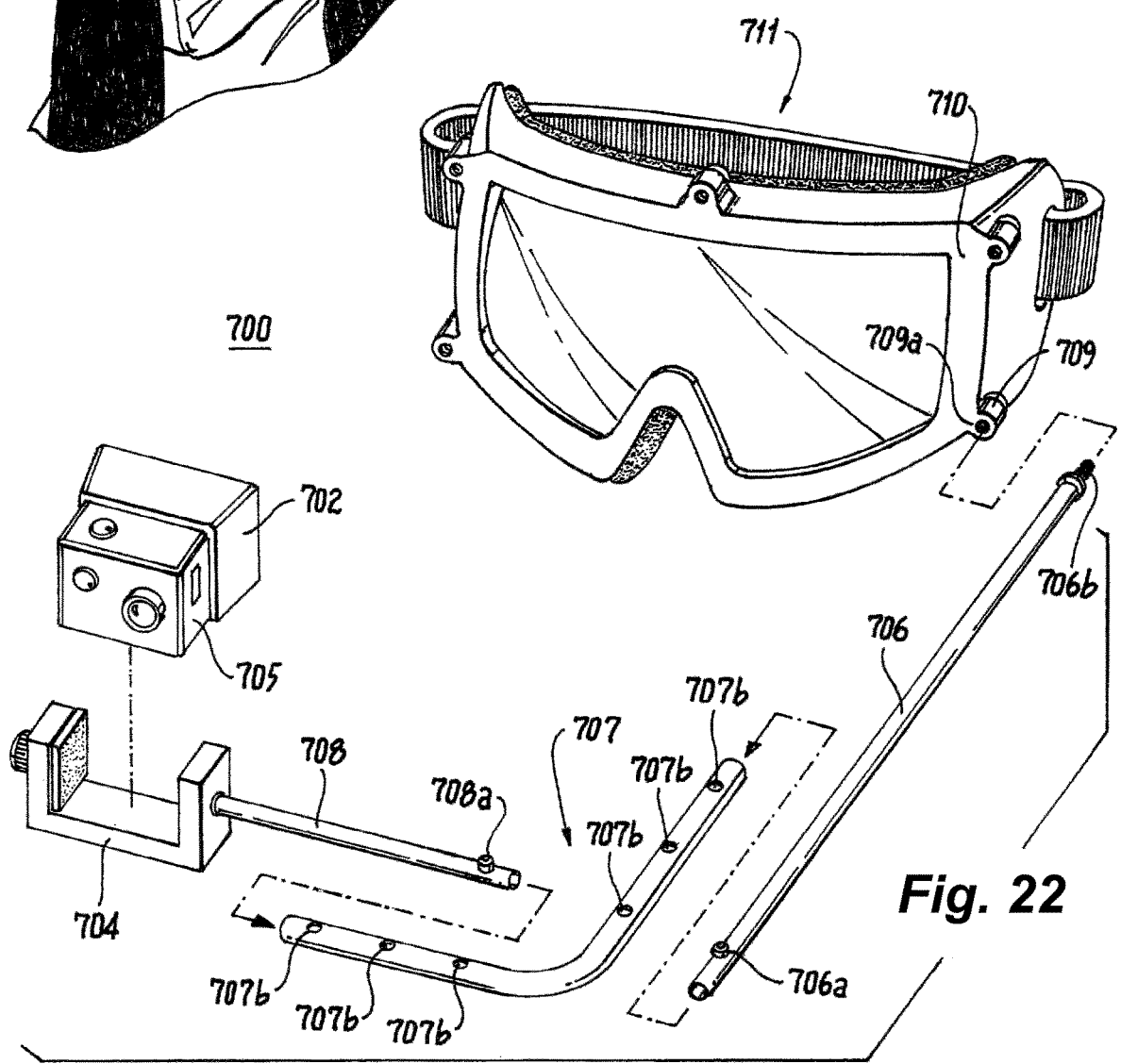

FIG. 22 is an exploded perspective view of the head mounted action camera of FIG. 21, mounted on the side of the goggles of the user.

Figure 23:
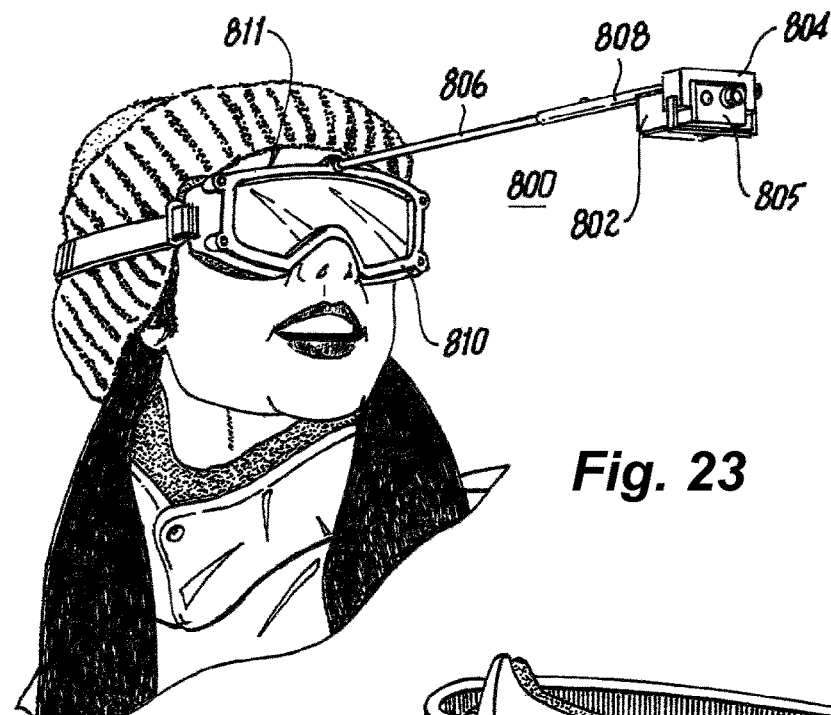

FIG. 23 is a close-up perspective view of a head-mounted action camera worn by a user, such as a skier wearing goggles, wherein the action camera is supported on the top of the goggles, by a telescopic arm which extends from a receiver located on the top of the goggles. The telescopic arm is provided with a clamp at a distal end thereof, to hold the action camera for viewing the viewing screen thereof. The action camera is also provided behind and adjacent to a small truncated pyramidal shroud enclosure of flared walls including a top wall, bottom wall and two descending side walls shielding the clamp-mounted action camera from direct sun glare, so that there is a shaded space between the eye of the user and the screen of the body worn action camera to reduce any glare on the viewing screen of the action camera, wherein the eyeball of the user, said wearable action camera, and said display screen jointly move, see, and record in any direction together.

Figure 24:
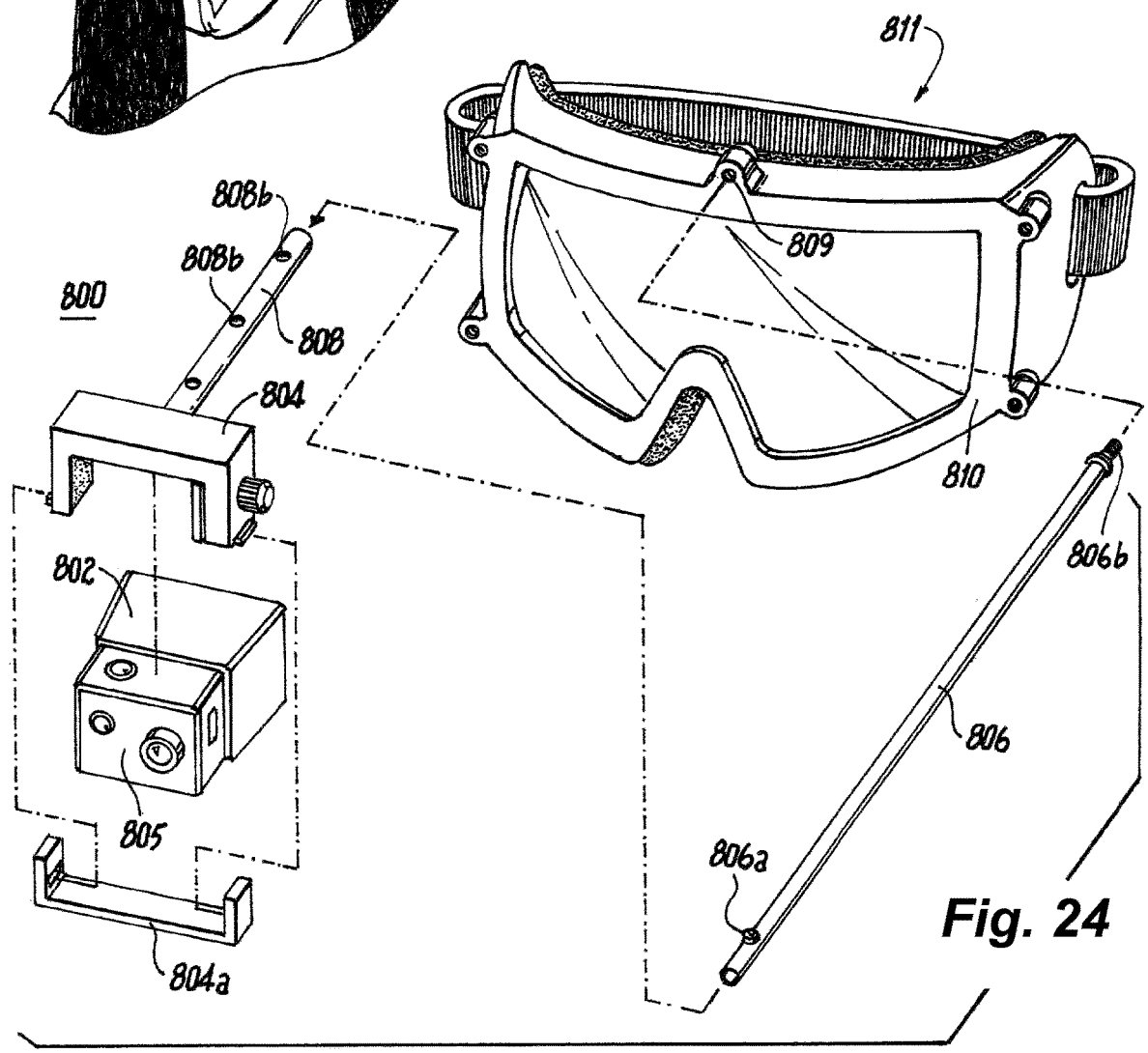

FIG. 24 is an exploded perspective view of the head mounted action camera of FIG. 21, mounted on the top of the goggles of the user.

Figure 25:
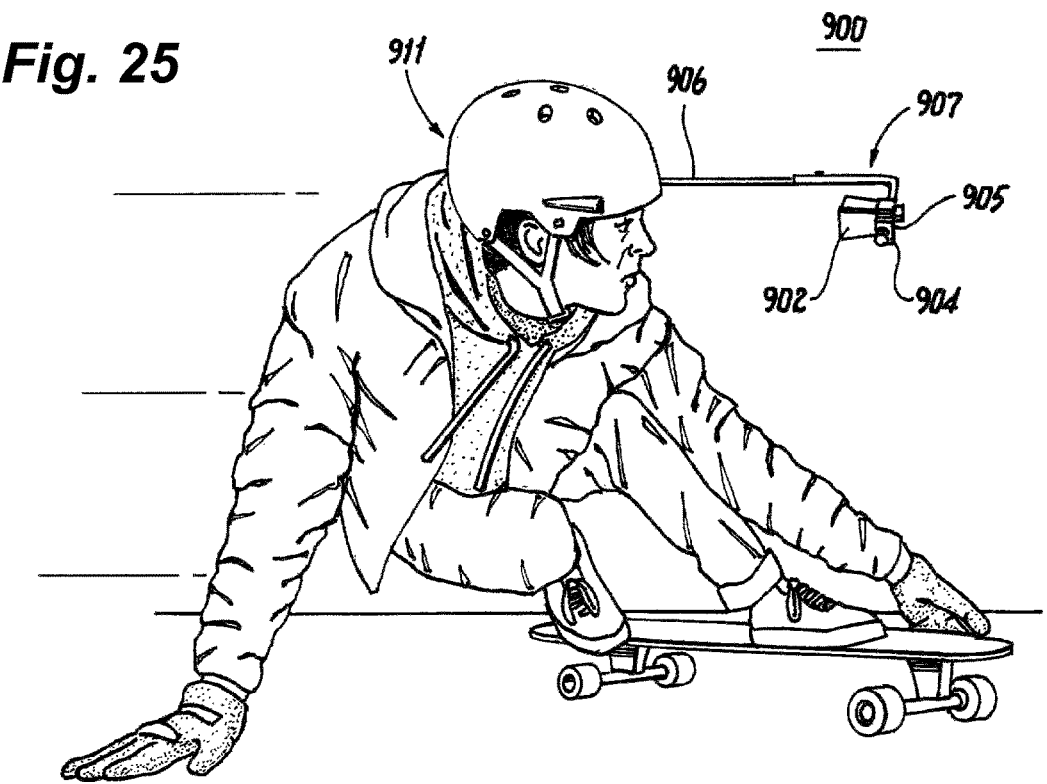

FIG. 25 is a side perspective view of a helmet-mounted action camera worn by a user, such as a skateboarder, wherein the action camera is supported on the side of the helmet, by a telescopic arm which extends from a receiver located on the side of the helmet. The telescopic arm is provided with a clamp at a distal end thereof, to hold the action camera for viewing the viewing screen thereof. The action camera is also provided behind and adjacent to a small truncated pyramidal shroud enclosure of flared walls including a top wall, bottom wall and two descending side walls shielding the clamp-mounted action camera from direct sun glare, so that there is a shaded space between the eye of the user and the screen of the body worn action camera to reduce any glare on the viewing screen of the action camera, wherein the eyeball of the user, said wearable action camera, and said display screen jointly move, see, and record in any direction together.

Figure 26:
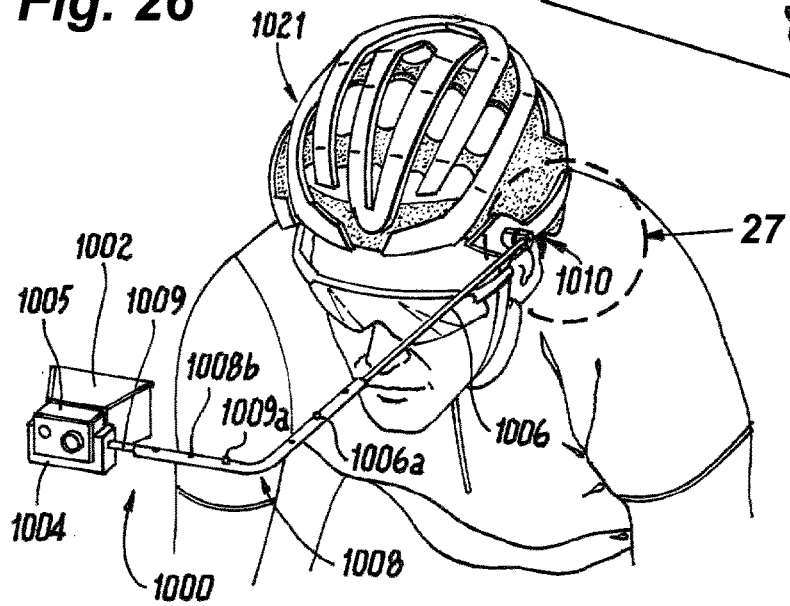

FIG. 26 is a close-up front perspective view of a bicyclist's helmet mounted action camera wherein the action camera is supported on the side of the bicyclist's helmet, by a telescopic arm which extends from a receiver located on the side of the helmet. The telescopic arm is provided with a clamp at a distal end thereof, to hold the action camera for viewing the viewing screen thereof. The action camera is also provided behind and adjacent to a small truncated pyramidal shroud enclosure of flared walls including a top wall, bottom wall and two descending side walls shielding the clamp-mounted action camera from direct sun glare, so that there is a shaded space between the eye of the user and the screen of the body worn action camera to reduce any glare on the viewing screen of the action camera, wherein the eyeball of the user, said wearable action camera, and said display screen jointly move, see, and record in any direction together.

Figure 27:
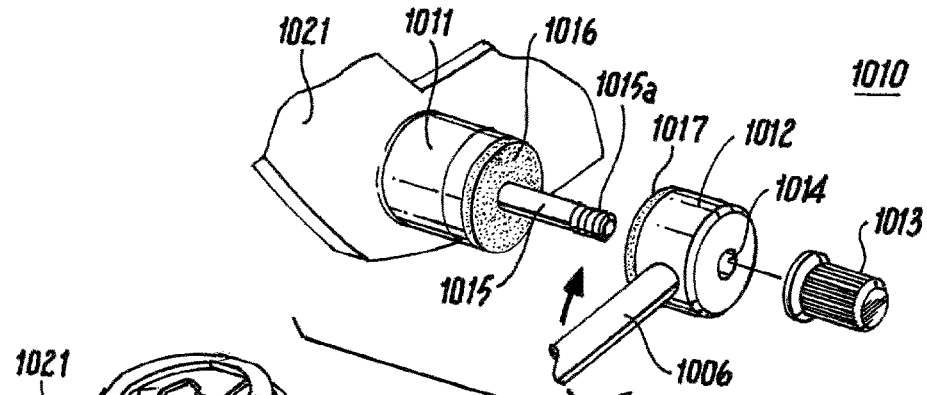

FIG. 27 is a close-up detail view of a friction hinge, as shown in the dashed circle "27" of FIG. 26, allowing rotation of the arm of the telescopic arm, where each side of the friction hinge has a textured or abraded surface to allow rotation and fixation of the telescopic arm at a preferred position of viewing the action camera suspended from the bicycle helmet of FIG. 26.

Figure 28:
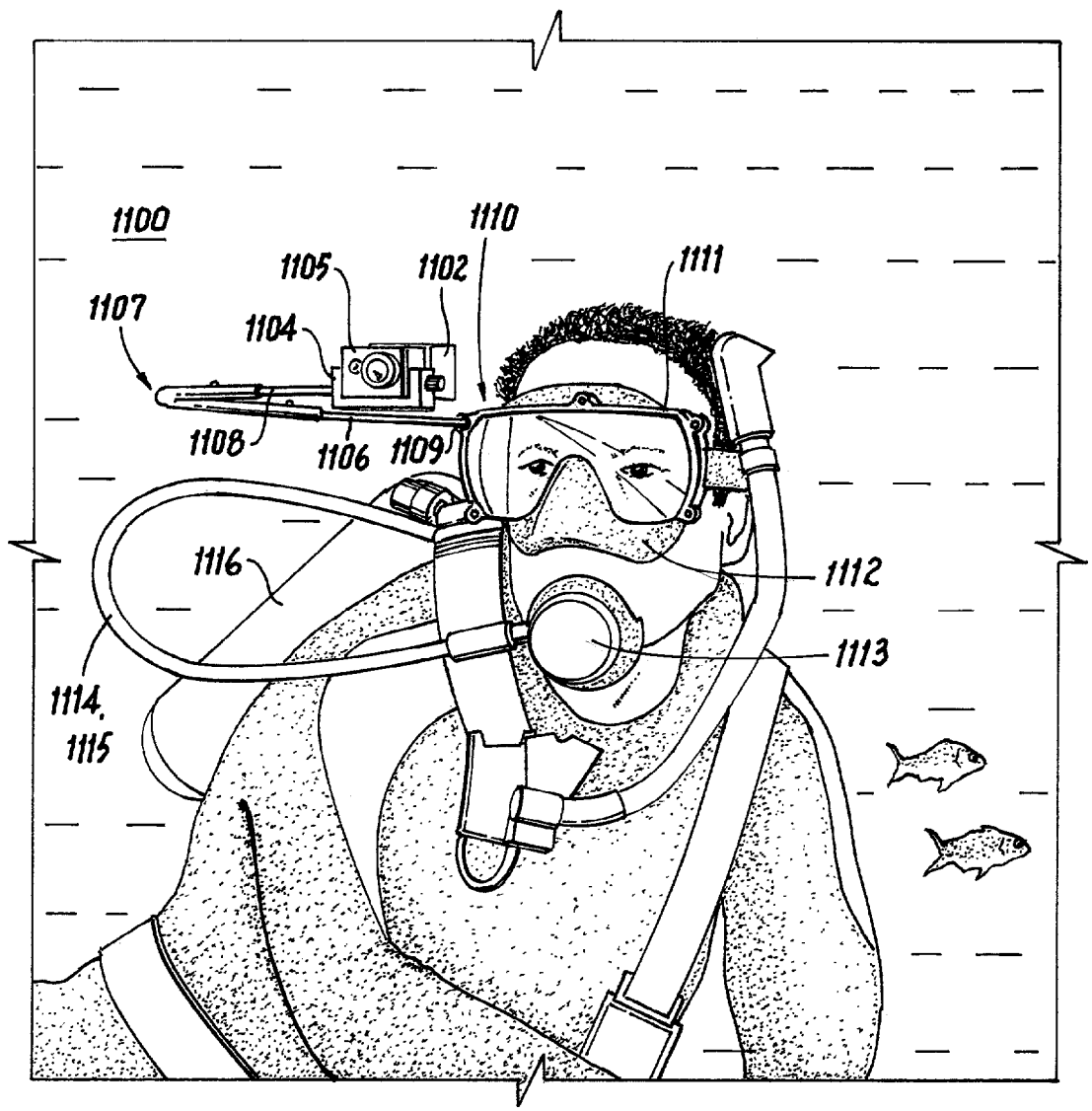

FIG. 28 is a close-up detail perspective view of a submersible, waterproof action camera and supportive enclosure, which can be positioned by the clamp, whereby the eyeball of the diver, viewing through the eye lenses of an underwater scuba/snorkeling mask with retainer straps, in combination with the submersible, waterproof wearable action camera, and the display screen also jointly and simultaneously move, see, and record in any direction together below the surface under water.

DETAILED DESCRIPTION OF THE INVENTION

The present invention has broad applications to many technical fields for a variety of photographic applications. However, it is particularly adapted for use by a photographer hiking in a field for still images, or by a photographer wearing a wearable action video camera, and for illustrative purposes only, that preferred mode for carrying out the invention is described herein.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include," "including," and "includes" mean including but not limited to.

The phrases "at least one," "one or more," and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

FIG. 1 shows a hiker having a glare reducing apparatus 1 including an opaque flexible bellows-type corrugated expandable and retractable pipe shield 2 in front of the hiker, with the flexible opaque bellows-type corrugated expandable and retractable pipe shield 2 having outside at its distal end a frame 3 having a clamp 4 holding a smartphone camera 5, with a grasping handle 6 of an upright camera grip post 7 provided beneath the smartphone camera 5, wherein the grasping handle 6 has actuating buttons B, such as Wi-Fi or Bluetooth, for operating the smartphone camera remotely with the user's hands. Optionally the smartphone camera 5 can be voice activated through a built-in microphone M, such as associated with Android Google Access®software or via an Apple iPhone Voice Control®software.

For proper fit, the flexible bellows-type corrugated expandable and retractable pipe shield 2 is secured to a collar 2a, where the collar 2a is attachable to the frame 3.

FIG. 2 shows the glare free apparatus 1 having the flexible, opaque bellows corrugated expandable and retractable pipe shield 2, collar 2a, adjacent to the frame 3 having a clamp 4 holding the smartphone camera 5 upon a handle 6 of the camera grip post 7, when the images of the smartphone camera 5 are viewed by a user from the opposite side of the flexible, opaque bellows corrugated expandable and retractable pipe shield.

Figure 3:
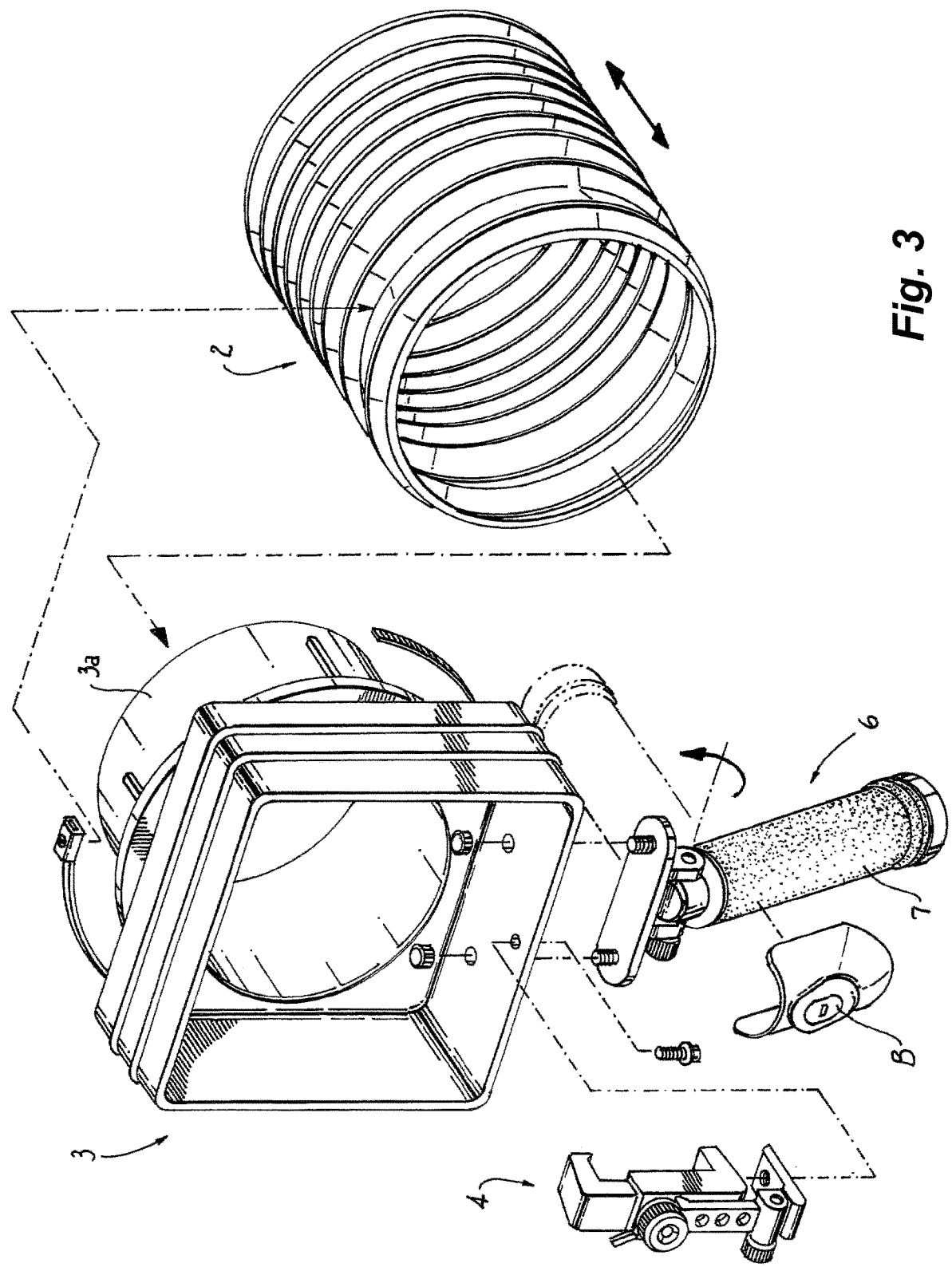
FIG. 3 is an exploded view of the components of FIGS. 1 and 2.

FIG. 3 shows an exploded view of the components of FIGS. 1 and 2, with a curved arrow showing that the handle 6 of the camera grip 7 is pivotable, to allow the user to position the glare free apparatus 1 in an optimal position for taking picture images or videos with the smartphone camera 5. The linear arrow shows the user's expansion and retraction of the flexible, opaque, corrugated pipe shield 2.

FIG. 4 shows in close-up detail view the camera holding frame 3 and collar 2a for attaching the distal end of the flexible, opaque bellows glare-reducing shield 2 to frame 3.

FIG. 5 shows showing by the zig-zagged dashed directional arrow the insertion of the smartphone camera 5 within the clamp 4 or other slide-in receptacle of the camera holding frame 3, provided adjacent to the collar 2a located at the distal end of the flexible, opaque bellows corrugated glare-reducing shield 2 of FIG. 4. The linear bidirectional arrow of Clamp 4 is slidably movable, where movable tongue portion 4a slides and nests within a corresponding hollow interior of stationary portion 4b of clamp 4. FIG. 5 also shows the curved bi-directional arrow indicating the pivoting upward of the camera-holding frame 3 away from the vertical axis of the handle 7 of the camera grip 6, so that upward extending camera scenes, such as nighttime stars in the sky, can be photographed with the smartphone camera 5.

Figures 6, 7:
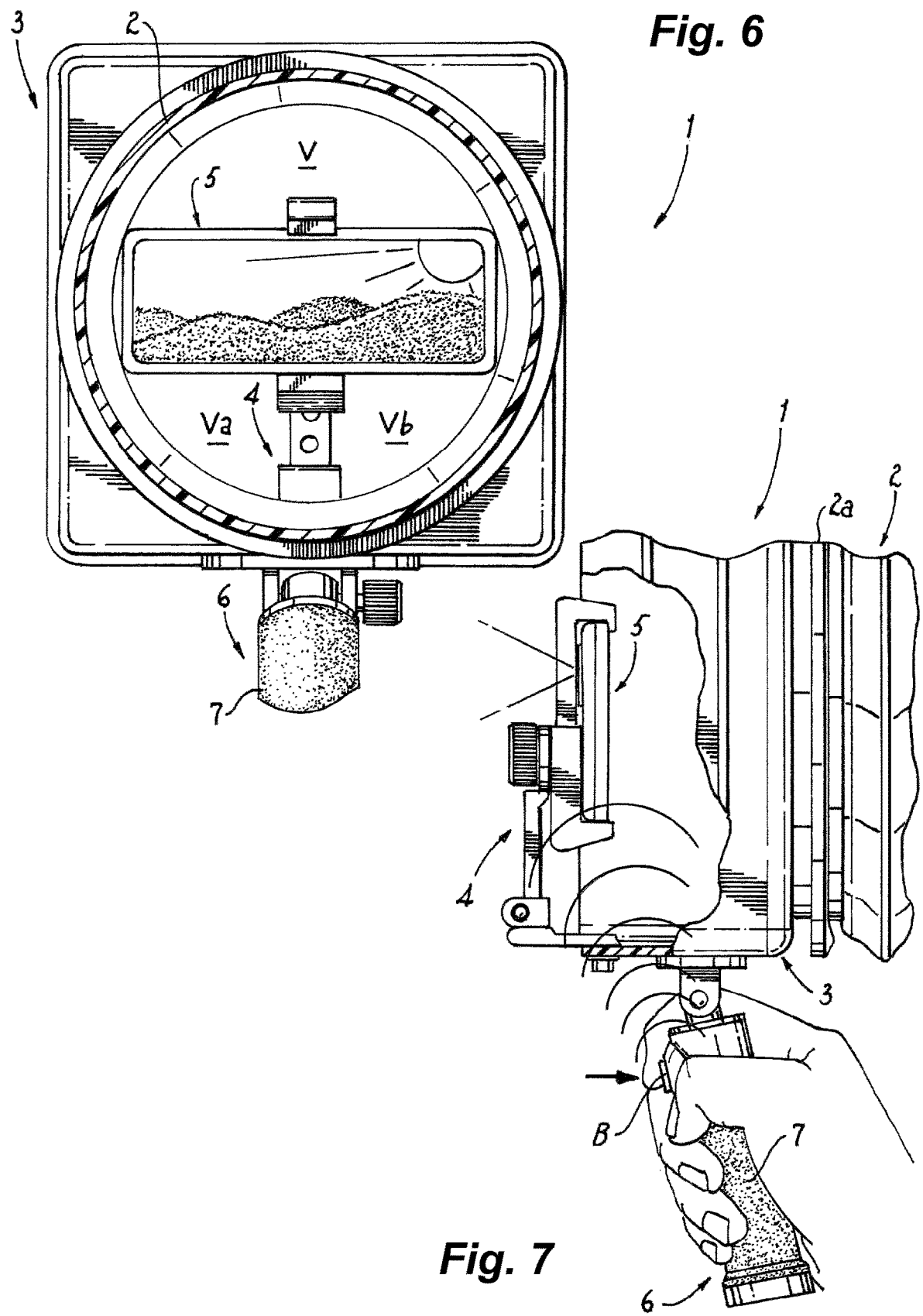
FIG. 6 is a rear view, shown from the user's viewpoint, looking into the flexible, opaque bellows corrugated glare-reducing shield and at the smartphone camera held within the camera holding frame, adjacent to the distal end of the opaque bellows corrugated a shield.
FIG. 7 is a close-up side view of the camera grip handle for actuating Wi-Fi/Bluetooth signals to activate taking images with the smartphone camera, or having a microphone for voice activation of the smartphone camera image taking of still photographs or moving video images.

FIG. 6 shows the rear of the anti-glare apparatus 1 from the rear, showing the user's viewpoint, looking into the flexible, opaque bellows corrugated glare-reducing shield 2 and at the smartphone camera 5 being held within the camera holding frame 3 located adjacent to the distal end of the at the flexible, opaque bellows corrugated glare-reducing shield 2.

In order for the invention to work, the user must survive the use and not be injured because of lack of visibility through the viewing field of the circular flexible corrugated bellows-type pipe shield 5. Therefore, FIG. 6 also shows the rear of the anti-glare apparatus 1, showing the user's viewpoint, looking into the flexible opaque bellows pipe glare-reducing shield 2, but also shows the division of the user's viewing filed separated into three parts, namely an unencumbered viewing area "V" above and outside of the viewing field "Wa" of the screen of the smartphone camera 5, a middle layer for the viewing field "Wa" of the smartphone camera 5 and its built-in viewing screen, and a pair of smaller unencumbered viewing areas "Va" and "Vb", located under the smartphone camera 5, and separated by the clamp 4 of the frame 3, also for the viewer to look therethrough and outside of the viewing field "Wa" of the smartphone camera 5. FIG. 6 also shows width dimension "W" and height dimension "H" of the smartphone camera holding frame 3, as well as the height "Ha" of the unobstructed viewing area above the smartphone camera 5.

In a typical situation, the frame 3 supporting he flexible, corrugated pipe shield 2 is between 5 and 6 inches in diameter, to accommodate smartphones 5 with cameras, where the smartphone cameras 5 are between four and six inches in width when measured along their respective longest edges in the horizontal position of use for taking photographs, using the smartphone's camera.

FIG. 7 shows the side of the camera grip handle for actuating Wi-Fi/Bluetooth signals to activate taking images with the smartphone camera, where the smartphone camera 5 has a built-in microphone M for voice activation of the smartphone camera image taking of still photographs or moving video images.

A ¾ inch to 1 inch nylon flexible strap with parachute clips is affixed to each 2-inch side to secure the headband device 101a, 101b around the head of the user/wearer.

Figure 8:
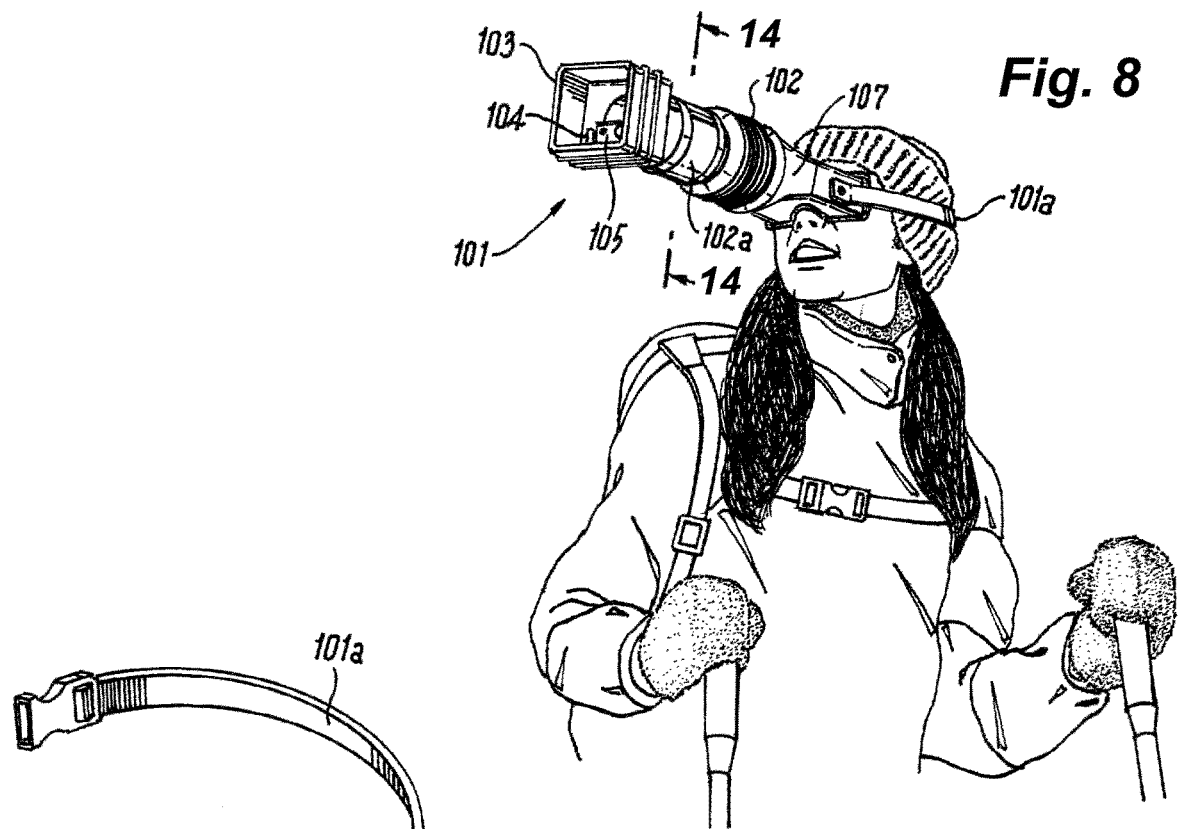
FIG. 8 is a perspective view, of an alternate embodiment for a headband support, showing a hiker in the woods, wearing the anti-glare shield with a wearable action camera, such as a "Go Pro" camera positioned therein.

FIG. 8 shows an alternate embodiment for a headband 101a, 101b supported anti-glare apparatus 101, showing a hiker in the woods. Optionally the video imagery can be captured via voice commands through the built-in microphone "M" of the wearable action camera 105.

FIG. 8 also shows the user wearing the anti-glare apparatus 101 having a two-part headband 101a, 101b, supporting a wearable action camera 105 (such as a "GoPro" wearable action camera) where the headband 101a, 101b supports a cantilevered flexible, opaque, corrugated, expandable and retractable pipe shield 102 with collar 102a extending outward therefrom. At the distal end of the flexible cantilevered flexible, opaque, corrugated, expandable and retractable pipe shield 102 having a collar 102a, there is provided a frame 103 with a clamp 104 having a ledge "L" for holding a head worn wearable action camera 105, such as a "Go Pro" action video camera positioned in the frame 103 by a clamp 104 having a ledge "L" for supporting the head wearable action camera 105 positioned thereon. Viewing goggles 107 for the user are located at the proximal end of the flexible, corrugated, expandable pipe shield 102. The operation of the wearable action camera 105 can be activated by a button "B", or by voice activation with a built-in microphone "M" of the wearable action camera 105, which is normally used to record audio associated with the video images taken with the GOPRO®, or other wearable action camera 105. If the audio output needs to be stronger to activate the wearable action camera 105, an auxiliary microphone "M" can be provided in the headband 101a worn by the user.

Figure 9:
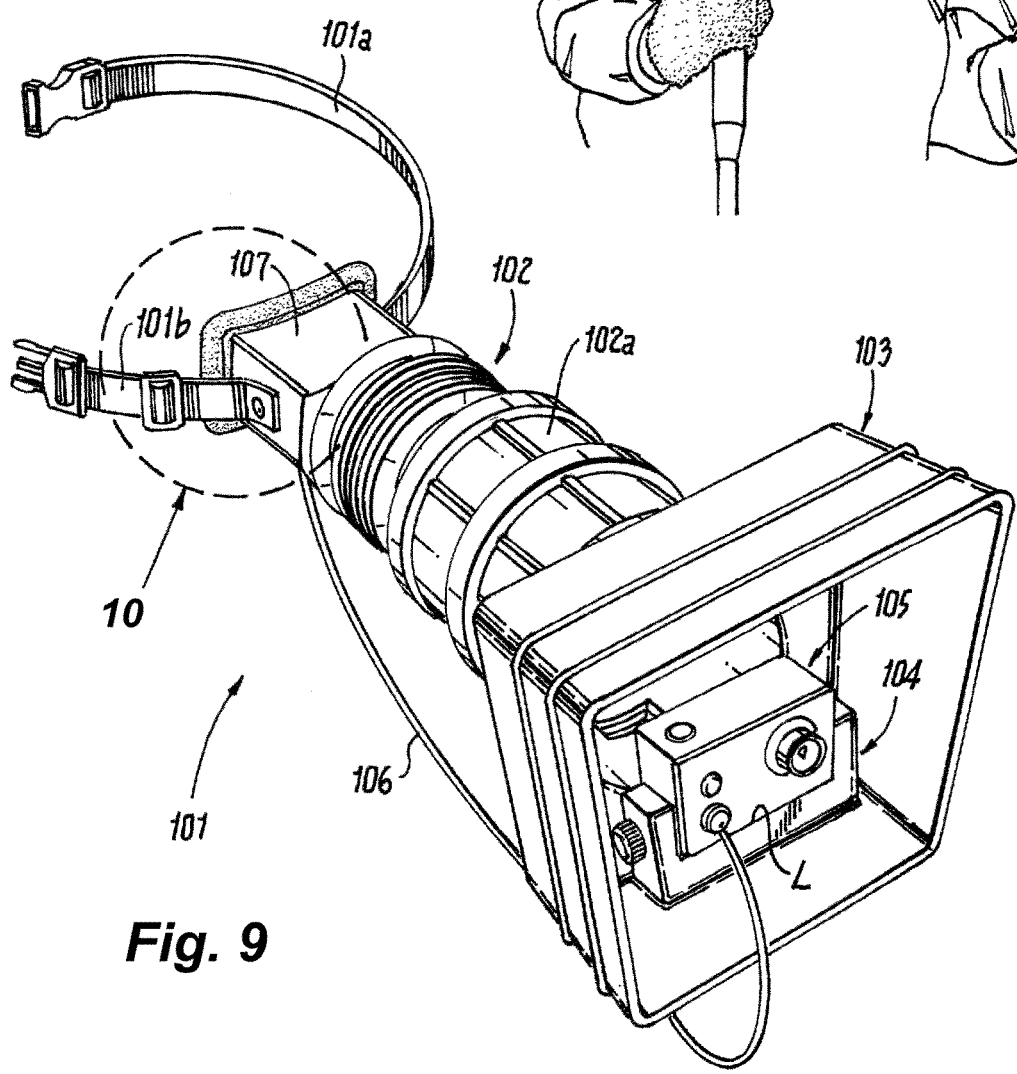
FIG. 9 is a perspective view of the headband supporting the anti-glare shield of FIG. 8, showing the headband being two joinable straps, which are joined by a fastener (which are well known in the art as parachute clips), where the fastener includes a receptacle on one of the headband straps. The fastener also includes a prong on the other of the headband straps. When joined, the two straps of the headband form a single headband around the head of the user to support the glare-reducing pipe shield, having the wearable action camera at the distal end of the pipe shield.

FIG. 9 shows the headband 101a supporting the cantilevered flexible, opaque, corrugated, expandable and retractable pipe shield 102 with collar 102a, at the proximal end thereof, of the anti-glare apparatus 101 of FIG. 8. A set of eye goggles 107 are also attached for the eyes of the viewer at the proximal end of the flexible, opaque, corrugated, expandable and retractable pipe shield 102, which is attached at pipe shield collar 102a to camera holding frame 103, having clamp 104, for holding the wearable action camera 105 therein.

FIG. 9 also shows the opaque flexible, corrugated pipe shield 102 being attached at its proximal end near the user viewer, to user viewable goggles 107. Additionally, FIG. 9 shows the headband being two joinable straps 101a, 101b, which are joined together by a fastener, where the fastener includes a receptacle 108a on one of the headband straps 101a. The fastener also includes a prong 108b on the other strap 101b of the headband straps 101a, 101b. When joined, the two straps 101a, 101b of the headband form a single headband around the head of the user to support the glare-reducing pipe shield 102, having the wearable action camera 105 at the distal end of the pipe shield 102. FIG. 9 also shows a lasso-type tether 106 to protect the camera 105 from being lost if it is dislodged from the clamp 104 of the distal frame 103. The tether 106 is attached conveniently to the user's headband 101a, 101b, or other wearable garment.

FIG. 10 shows the head worn anti-glare apparatus 101 of FIGS. 8 and 9 from the front distal end thereof, showing the optional viewing user goggles holder 107 with a cushioned edge 107a for the user to rest his or her forehead and eye sockets there upon. FIG. 10 also shows headband straps 101a, 101b, as in FIGS. 8 and 9.

FIG. 11 shows the components of the anti-glare apparatus 101 including the flexible, opaque bellows glare-reducing shield 102 and camera holding frame 103 of FIGS. 8-10, with a wearable action camera 105 positioned therein upon a ledge "L" of clamp 104 of frame 103. Clamp 104 includes the horizontal ledge "L", but also upwardly extending walls 104a and 104b on each side of the clamp 104 to securely hold the camera 105 therein. An optional neck lanyard tether 106a is provided to additionally support the anti-glare apparatus 101 upon the neck and shoulders of the user.

FIG. 12 shows in a close-up detail view, the corner of the wearable action camera holding frame 103 of FIGS. 8-10 and shows the locking elements of clamp 104 for securely holding the wearable action camera 105 in place, cantilevered outward from the user's head worn headband 101a, 101b. FIG. 12 also shows a compressible fastener pad "P" on each of the upwardly extending arms 104a, 104b of FIGS. 9, 10, and 11.

Figure 13:
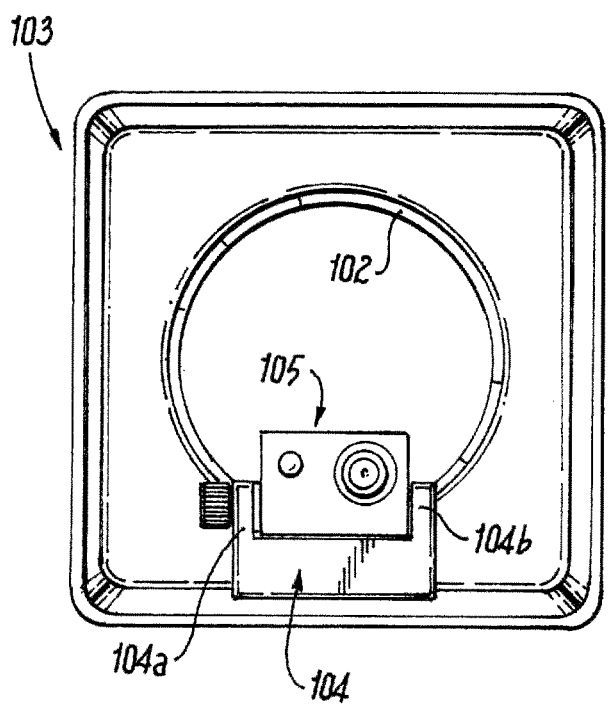
FIG. 13 is a front elevation view, showing the wearable action camera of FIGS. 8-13 being held in the camera holding frame, adjacent to the distal end of the flexible, opaque bellows glare shield, which extends cantilevered from a user's headband attachment for viewing scenes therethrough.

FIG. 13 shows the wearable action camera 105 of FIGS. 8-12 being held in the camera holding frame 103, adjacent to the distal end of the flexible, opaque bellows expandable and retractable pipe shield 102, which extends cantilevered from a user's headband 101a via an attachment for viewing scenes to be photographed or videoed therethrough. FIG. 13 is a front elevation view, showing the wearable action camera 105 of FIGS. 8-13 being held by the clamp 104, including upwardly extending arms 104a, 104b and pads "P", in the camera holding frame 103, adjacent to the distal end of the flexible, opaque, corrugated, expandable and retractable bellows pipe glare-reducing shield 102, which extends cantilevered from a user's headband attachments 101a, 101b having goggles 107 for viewing scenes therethrough.

Figure 14:
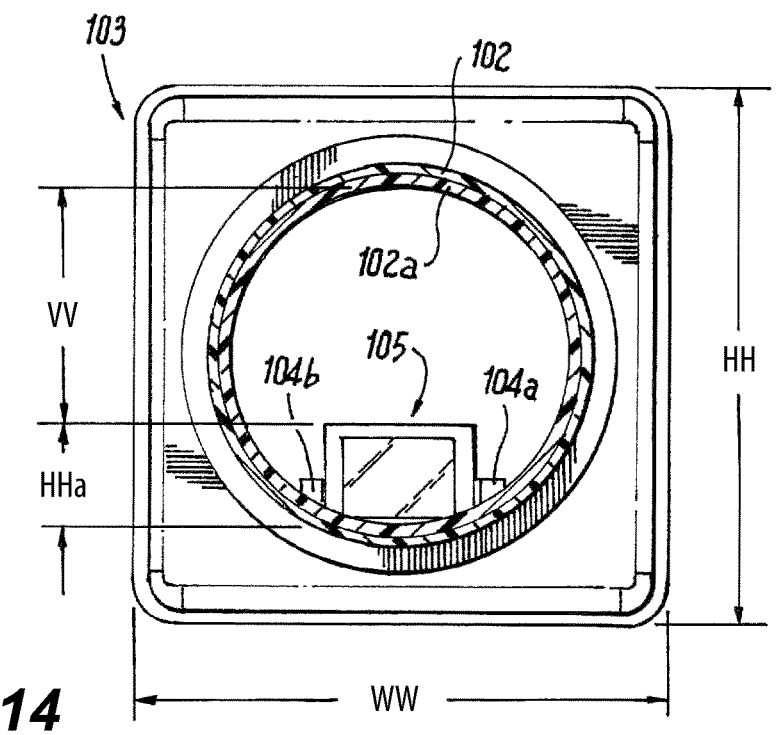
FIG. 14 is a sectional elevation view of the wearable action camera shown in FIG. 13, showing the inside of the flexible, opaque bellows glare-reducing shield and the wearable action camera positioned with a camera holding frame outside of the distal end of flexible, opaque bellows glare-reducing shield, or the glare-reducing shield of FIGS. 8-13.

FIG. 14 shows the inside of the flexible, opaque bellows, expandable, retractable pipe shield 102 and the wearable head wearable action camera 105 positioned with a clamp 104 of the camera holding frame 103, located outside of the distal end of flexible, opaque bellows expandable, retractable pipe shield 102 of FIGS. 8-13.

Additionally, as shown in FIG. 14, for safety reasons, there must be an unobstructed view in the field of view shown in the pipe shield 102, so that the wearer/user can see above the top of the wearable action camera 105 and have a clear view of any obstacles in his/her path during use of the wearable action camera 105.

FIG. 14 also shows the wearable action camera 105, shown in FIG. 13, showing the inside of the flexible, opaque bellows glare-reducing shield 102, and its attachment collar 102a. The wearable action camera 105 is positioned within the camera holding frame 103 outside of the distal end of flexible, opaque bellows glare-reducing shield 102. FIG. 14 also shows the wearable action camera 105, such as a "GoPro" camera, or the like, mounted on a ledge "L" outside of the circular field of view of 3½ inches, so that when positioned on the ledge "L", the camera screen is visible in the lower sector of the 3.5 inch circular viewing field, but that the top of the wearable action camera 105 still leaves a wide open viewing area that is 2.1 inches in height, to provide the user/viewer with an unobstructed view "VV" of a sector of the circular viewing area above the top of the "GoPro" camera. When larger diameter pipe shields are used, then the wide-open viewing area "VV" will be more than the minimally safe open viewing area of 2.5 inches in height.

Therefore, FIG. 14 shows the action head mounted camera 105, such as a "GoPro" camera, or the like, mounted within a frame 103 having a width "WW" of about 5½ inches and a height "HH "of about 5½ inches, where the camera 105 is mounted on a ledge "L" outside of the circular field of view of 3½ A inches, so that when positioned on the ledge "L", the camera screen of the wearable action camera 105 is visible for about ¾ of an inch above ledge "L", in the lower sector "WW" of the 3.5 inch circular viewing field, but that above the top of the action camera 105 there is provided a wide open viewing area geometric sector "VV"

at its highest point of the circular sector, that is 2.1 inches in height, to provide the user/viewer with an unobstructed view of a the circular sector viewing area "VV" above the top of the action camera 105, such as a "GoPro" camera. The top line of the wearable action camera 105 provides a flat geometric chord line forming the bottom of the unobstructed viewing sector area "VV".

FIGS. 15 and 16 show an alternate embodiment of a user conducting an on-going activity, such as skateboarding, user using the anti-glare apparatus 201 with the flexible, opaque bellows corrugated pipe shield 202, having the wearable action camera 205 being held within the clamp 204, located within the distal end of the flexible, tubular bellows-type pipe shield 202, while the skateboarder is moving on a skateboard and taking live action videos with the wearable action camera 205. The wearable action camera 205 is activated for video imagery, prior to the activity and allowed to video until the activity is ceased. The video capturing can be controlled remotely via Wi-Fi or Bluetooth, with an activation finger operable button "B" on the headband 201a, 201b or on a lasso type flexible cord 206 extending from the headband 201a, 201b for securing the wearable action camera 205 in place, so that if the wearable action camera 205 becomes dislodged from the ledge "L" of the clamp 204, the flexible lasso cord 206 can keep the dislodged wearable action camera 205 in the retrievable vicinity of the anti-glare apparatus 201. The lasso cord 206 can be attached securely to the headband 201a, 201b, or to a harness worn by user, so that the wearable action camera 205 can be retrieved if dislodged from ledge "L" of the clamp 204 of the anti-glare apparatus 201.

Additionally, FIG. 15 shows a pipe shield 202 with two different types of flexible corrugations, which can be assembled by making the pipe shield 202 from two separate removable or attachable corrugated pieces.

FIG. 17 shows an alternate embodiment, where the camera 305 of the anti-glare apparatus 301 is attached by a hook and loop (VELCRO®) fastener 304 directly within the distal end of the flexible pipe shield 302, for less rigorous activities.

FIG. 18 is an alternate embodiment for an anti-glare apparatus 401, where the flexible pipe shield 402 has a noncylindrical cross section to hold the camera 405 within the clamp 404, such as a square cross section or other geometric cross-sectional shape.

FIG. 19 is an alternate embodiment for an anti-glare apparatus 501, using the handheld embodiment of FIGS. 1-7 herein, but where the user wants to take a close-up photograph or video with the camera 505, located in clamp 504 of frame 503, of a skittish or dangerous animal, such as a butterfly or snake. Therefore, in FIG. 19, a removably attachable handle 506a with a Bluetooth camera activation button "B" is provided at the proximal end of the handheld glare reducing apparatus shield 502, spaced apart from the front of the apparatus 501, near the dangerous animal. While FIG. 19 shows the auxiliary proximal handle 506a, near the body of the user, and the original handle 506, located at the distal end of pipe shield 502, it is assumed that the anti-glare device 501 could have one or both handles 506, 506a either permanently attached or removably attached to the anti-glare apparatus 501.

FIG. 20 is a perspective view of further alternate embodiment 601 having an auxiliary slidable, pivotable visor 620 that can slide forward from a visor frame 622 mounted above the camera 505, to block any direct sunlight near the location of the camera 505 at the distal end of the opaque, flexible, compressible pipe shield 502, which is shown mounted upon the embodiment depicted in FIG. 19. The visor 620 of FIG. 20 may be used to combat glare when the user angles the camera 505 down in the clamp 504, thus potentially exposing the camera viewer window to light as it is outside of the enclosure of the opaque, flexible, compressible pipe shield 502. The visor has side rails 621 engageable with channel tracks 623 located on the inside of the visor frame 622. Optionally the visor 620 could have channels and the frame 622 could have rails. The extended visor 620, slidable forward from its support visor frame 622 provides shade over the exposed window, allowing the photographer to see his subject in the view window of the camera screen of camera 505.

The various embodiments for anti-glare devices 101, 201, 301, 401, 501 and 601 open a whole new universe of photography. For example, by flexing the opaque corrugated pipe shield 2, 102, 202, 302, 402, or 502, it is possible to video or still photograph around the corner of a building. Currently, the field of view for head wearable action cameras 105 is very wide, about 120-140 degrees to include everything. With the narrow field of view of the present invention with the photographer looking solely at the object desired to photograph, a many times larger image is recorded. There is no need to take a conventional wide-angle picture and crop.

Down to capturing the image, with the anti-glare apparatus of the present invention, the photographer now has a large image of colossal compositional flexibility.

The various inventive anti-glare apparatus' 1, 101, 201, 301, 401, 501 and 601 are extremely useful for nature and wildlife photographers who can extend the opaque corrugated pipe shield 2, 102, 202, 302, 402, and 502 holding the smartphone camera 5 or wearable action camera 105, 205, 305, 405, 505 to a distance which is safer and more usable. For example, the Applicant herein photographed a six-foot gigantic Moray eel and was almost bitten. By using the inventive embodiment of the anti-glare apparatus 501, shown in FIG. 19, the user herein would be able to remain at a safer distance away from the dangerous subject being photographed or videoed.

The head wearable anti-glare apparatus 101, 201, 301, 401, or 501 with the wearable action cameras 105, 205, 305, 405, or 505, iteration is extremely well suited for underwater photography, optionally with strap on headband pieces.

The inventive anti-glare apparatus' 1, 101, 201, 301, 401, and 501 are superb for flower photography and macro photography by maintaining a greater distance from the user to the flower thus eliminating many shadows.

The inventive anti-glare apparatus' 1, 101, 201, 301, 401, and 501 are also useful by extending the opaque, expandable or retractable corrugated pipe shield 2, 102, 202, 302, 402, or 502 for examining industrial machinery.

The flexible, opaque corrugated pipe shield 2, 102, 202, 302, 402, or 502 can be tilted up by pivoting at the joint where it meets the handle 7 of the camera grip 6, or from the headband 101a, 101b, to photograph the night sky and stars. Other hard to reach places: car repair, furnishing installation equipment, military, etcetera can use the anti-glare apparatus' 1, 101, 201, 301, 401, or 501.

The inventive handheld anti-glare apparatus 1 is also useful to allow smartphone users to sit on a bench in the sun and read or work on their smartphones 5.

The inventive apparatus 1 improves reading on the smart phone 5 by making whatever is on the phone 5 clearer and more distinct and easier to see and observe glare free.

The anti-glare apparatus' 1, 101, 201, 301, 401, and 501 may also include a 6×6×6 diameter downspout adaptor to which a compressible, flexible, HVAC (heating, ventilation, air conditioning) 6-inch tubing is attached to the round end of the downspout adaptor with a stainless-steel clamp. A camera handgrip such as a camera grip post 6 is attached on the outside of the downspout adaptor, which acts as the flexible, opaque, corrugated pipe shield 2. The outside of the downspout adapter can also attach directly to the headband 101a, 101b and goggles 107 associated with the wearable action camera 105. Inside the 6×6×6 downspout adaptor on the bottom is a metal phone tripod mount attached with a ¼-inch bolt to hold the smartphone 5, wearable action camera 105 or other photographic device. The smartphone holder frame 3, 103, 203, 303, 403 or 503 may each have a pivot to swing the camera 105, 205, 305, 405, or 505 out of the clamp 4, 104, 204, 304, 404 or 504 for camera positioning adjustments. For example, the Amarok Phone Holder is pivotable. There are many other smartphone holders suitable for the invention offered on Amazon. The Applicant herein has an Apple iPhone 14 Pro Max which just barely fits into the opening. Other smartphones or photographic devices which are smaller can easily fit in. If necessary, a larger downspout adapter can be made and used as the flexible, corrugated pipe shield 2, 102, 202, 302, 402, or 502. There are thousands and thousands of downspout adapters currently in use in the US and they are manufactured by injection molding very quickly. The user of the glare resistant apparatus 1, 101, 201, 301, 401, or 501 merely has to insert the smartphone camera 5 or the wearable action camera 105, 205, 305, 405, or 505 into the clamp 4, 104, 204, 304, 404, or 504 of the frame 3, 103, 203, 403, or 503, pick up the assembled apparatus device 1 with the handle 6, of FIGS. 1-7 and 19-20, or don the headband of FIGS. 8-18 and use. For the flexible, opaque expandable and retractable corrugated pipe shield 2, 102, 202, 302, 402, or 502 a flexible 6" or 7" corrugated HVAC pipe is extended or retracted extremely rapidly.

For the user's visual acuity, one purpose of the expandable and retractable telescoping object of the anti-glare apparatuses of the present invention is to custom fit the specific eye characteristics of the photographer. Whether the user is near sighted, far sighted, uses contact lenses, glasses, all can be adjusted by the expandable and retractable telescoping feature of the anti-glare apparatuses of the present invention. The expandable and retractable telescoping feature of the present invention allows the user the ability to adjust the telescoping to the time of day or light conditions. For example, it is thought at 12 noon, with the sun directly overhead, the telescoping and the expandable and retractable pipe shields would not require much extension, but moreover by early morning or late afternoon when the sun is at a sharp angle more extension of the flexible, opaque corrugated HVAC pipes would be required.

As noted above, one iteration of the invention is an apparatus which includes essentially of a PVC downspout adapter pipe (tradename: "5×5×4", which means the first two numbers are the upper width and length, in inches, and the last number is the diameter, in inches, of the pipe).

In one example, the "5×5×4" downspout adapter forming the flexible, opaque, corrugated pipe shields, are joined to a FLEX-DRAIN® piping, having dimensions of 2×3×4 inches of the flexible downspout adapter, and an expandable small downspout adapter. The 4-inch pipe opening from the 5×5×4 inch downspout adapter plugs into the 4-inch hole on the flexible downspout adapter. The thus formed pipe shield can be expanded from 8.5 inches to 12.5 inches in length, due to its corrugated, compressible, and retractable corrugated shape. There are lightweight, quick PVC couplings to add increased length, or cut to shorten the adapter. A "GoPro" or other wearable action camera is installed on the inside ledge "L" of the 5×5×4 downspout adapter, forming the frame for holding the wearable action camera adjacent to the distal end of the flexible adapter forming the flexible, opaque, corrugated pipe shield of the embodiment shown in drawing FIGS. 8-18 herein.

This expansion can be increased by manufacturing more corrugated, expandable, and retractable bellows type folds. The purpose of the expansion or contraction is bespoken to the individual eyesight of each user, as there is considerable variability with eyesight.

Also in the downspout adapter embodiment, the wearable, action camera, such as a "GoPro Hero 11" head wearable action camera or the like, is installed on the bottom, 5-inch side of the downspout adapter. There is a ¾ inch ledge "L" to position and seat the wearable action camera thereon, so that the bottom edge of the camera screen touches the perimeter of the 3.5-inch opening of the pipe shield.

As can be seen in the drawing FIGS. 1-20, an enormous amount of unobstructed viewing area above the viewing screen of the wearable action camera, to the top of the 3.5-inch opening of the flexible, opaque, corrugated pipe shield, is revealed. At the least, the dimensions are greater than the viewing screen on the "GoPro Hero 11" camera alone. This area of an unencumbered view V promotes safety as the photographer has a very broad field of view, or point of view. The Applicant herein experimented with several downspout adapters before arriving at the desirable 5×5×4 downspout adapters. All were unsatisfactory for various reasons. The 6×6×6 downspout adapter is possible to use, but it requires a lot of new engineering to make it practical for use.

A major inventive step is placing the eyeball of the photographer directly behind the display screen in real-time, moment to moment of the head wearable action camera. The eyeball of the user, the wearable action camera, and display screen thereof are one which move, see, and record in any direction together, which is a groundbreaking, game changing advance. GOPRO® discloses an estimate of 30 mounts for "GoPro" cameras to make a wearable action camera.

None of them place/tie the eyeball to the display screen in real-time, moment to moment. As previously noted, the closest state of the art, "Head Strap 2.0," fits the camera around the top of the head of the user, which can be seen in the Head Strap 2.0 website. Additionally, the top of the head of the photographer is not the eye of the photographer, so the photographer is unable to see what the camera sees. The B&H PHOTO VIDEO® Electronics and Camera Store, and other manufacturers of mounts for head wearable action cameras, have dozens of mounts that do not connect the photographer's eyeball view to the display screen in real-time, moment to moment.

In a further embodiment for the body worn action camera, FIGS. 21-28 show that the opaque, glare-reducing enclosure is not a flexible tubular corrugated enclosure, but is a small shroud enclosure of a top wall, bottom wall and two descending side walls shielding the action camera from direct sun glare, so that there is a shaded space between the eye of the user and the screen of the body worn action camera to reduce any glare on the viewing screen of the action camera.

For example, FIG. 21 shows a head-mounted action camera 705 worn by a user, such as a skier wearing goggles 711, wherein the action camera 705 is supported on the side of the goggles 711, by a telescopic arm 700 which extends from a receiver concavity 709 having a threaded recess 709a located on the side of the goggles 711. The telescopic arm preferably includes tube 706 having a threaded male end 706b engageable within threaded recess 709a of receiver 709, where the tube 706 has a distal end with a protrusion 706a insertable within user selected apertures 707b, 707b, 707b, etc. located upon elbow tube 707. The protrusion 706a is the male portion of an internal spring clip hidden within tube 706. This is a well-known fastener in the art. When tube 706 is inserted into elbow tube 707, the protrusion will be cammed downward, and will then emerge once passed under hole 707b. A corresponding clamp supporting tube 708 includes a protrusion 708a insertable within one of the user selectable apertures 707b, 707b, 707b, etc. located on elbow tube 707. The telescopic arm 700 is provided with a clamp 704 at a distal end thereof, to hold the action camera 705 for viewing the viewing screen thereof. The action camera 705 is also provided behind and adjacent to a small truncated pyramidal shroud enclosure 702 of flared walls including a top wall, bottom wall and two descending side walls shielding the viewing screen of the clamp-mounted action camera 705 from direct sun glare, so that there is a shaded space between the eye of the user and the screen of the body worn action camera 705, to reduce any glare on the viewing screen of the action camera 705, wherein the eyeball of the user, the wearable action camera 705, and the display screen of the action camera 705 jointly move, see, and record in any direction together.

FIG. 22 is an exploded perspective view of the head mounted action camera 705 of FIG. 21, mounted on the side of the goggles 711 of the user.

FIG. 23 shows a head-mounted action camera 805 worn by a user, such as a skier wearing goggles 811, wherein the action camera 805 is supported on the mid-top region 810 of the goggles 811, by a telescopic arm 800 which extends from a receiver concavity 809 having a threaded recess 809a located on the top frame 810 of the goggles 811. The telescopic arm 800 preferably includes tube 806 having a threaded male end 806b engageable within threaded recess 809a of receiver 809, where the tube 806 has a distal end with a protrusion 806a insertable within user selected apertures 808b, 808b, 808b, etc. etc. located upon clamp support tube 808. The protrusion 806a is the male portion of an internal spring clip hidden within tube 806. This is a well-known fastener in the art. When 806 is inserted into 807, the protrusion will be cammed downward, and will then emerge once passed under hole 807b. The clamp supporting tube 808 supports the preferably two-piece clamp with top clamp piece 804, and bottom clamp piece 804a at a distal end thereof, to hold the action camera 805 for viewing the viewing screen thereof. The action camera 805 is also provided behind, and adjacent to, a small truncated pyramidal shroud enclosure 802 of flared walls including a top wall, bottom wall and two descending side walls, shielding the viewing screen of the clamp-mounted action camera 805 from direct sun glare, so that there is a shaded space between the eye of the user and the screen of the body worn action camera 805, to reduce any glare on the viewing screen of the action camera 805, wherein the eyeball of the user, the wearable action camera 805, and the display screen of the action camera 805 jointly move, see, and record in any direction together.

FIG. 24 shows the head mounted action camera 805 of FIG. 23, shown mounted on the top of the goggles 811 of the user.

FIG. 25 shows a helmet-mounted action camera 905 worn by a user, such as a skateboarder, wherein the action camera 905 is supported on the side of the skateboarder's helmet 911, by a telescopic arm 900, which extends from a receiver located on the side of the skateboarder's helmet 911. The telescopic arm 900 is provided with a clamp 904 at a distal end thereof, to hold the action camera 905 for viewing the viewing screen thereof. The action camera 905 is also located behind, and adjacent to, a small truncated pyramidal shroud enclosure 902 of flared walls including a top wall, bottom wall and two descending side walls shielding the clamp-mounted action camera 905 from direct sun glare, so that there is a shaded space between the eye of the user and the screen of the helmet worn action camera 905 to reduce any glare on the viewing screen of the action camera 905, wherein the eyeball of the user, said wearable action camera 905, and said display screen jointly move, see, and record in any direction together.

FIG. 26 shows an alternate embodiment of a bicyclist's helmet mounted action camera 1005, wherein the action camera 1005 is supported on the side of the bicyclist's helmet 1021, by a telescopic arm 1000, which extends from a receiver located on the ear covering side portion 1022 of the bicyclist's helmet 1021. The telescopic arm 1000, comprising support tube 1006, connected to elbow tube 1008 via reciprocating protrusions and apertures. The elbow tube 1008 is connected to clamp holding tube 1009, by protruding member 1009a, which supports a clamp 1004 at a distal end thereof, to hold the action camera 1005 for viewing the viewing screen thereof. The spring-loaded protruding member 1009a remains hidden inside the elbow tube 1008 until it protrudes upward out of a hole 1008b of the elbow tube 1008. The action camera 1005 is also located behind, and adjacent to, a small truncated pyramidal shroud enclosure 1002 of flared walls including a top wall, bottom wall and two descending side walls shielding the clamp-mounted action camera 1005 from direct sun glare, so that there is a shaded space between the eye of the user and the screen of the body worn action camera 1005 to reduce any glare on the viewing screen of the action camera 1005, wherein the eyeball of the user, the wearable action camera, and the display screen jointly move, see, and record in any direction together.

FIG. 27 is a close-up detail view of a friction hinge 1010, as shown in the dashed circle "27" of FIG. 26, allowing rotation of the tube 1006 of the telescopic arm 1000, where each corresponding side 1011 and 1012 of the friction hinge 1010 has a textured or abraded surface 1016, 1017 to allow rotation and fixation of the tube 1006 at a preferred position of viewing the action camera 1005 suspended by telescopic arm 1000, which is attached to ear covering portion 1022 of the bicycle helmet 1021 of FIG. 26. The friction hinge 1010 includes stationary portion 1011 and pivotable portion 1012. Fixed portion 1011 also includes rod 1015 with threaded distal head 1015a. Rod 1015 with head 1015a is inserted within through-hole 1014 within pivotable hinge portion 1012, and thereafter inserted into a female threaded portion within manually graspable nut 1013 to permit pivoting of tube 1006 attached to pivotable hinge portion 1012.

It is further noted that the rotatable friction hinge 1010 shown in FIG. 27 can be optionally used with any of the telescopic arms 700 of FIGS. 21 and 22, 800 of FIGS. 23 and 23, 900 of FIGS. and 1000 of FIG. 26. Additionally, the clamps 704, 804, 904 and 1004 are interchangeable with any of the embodiments shown in FIGS. 21-26.

Optionally, cotter pins can be used for fastening the components of the embodiments in FIGS. 21-28 together, to affix the rod and or tube to the goggles in the ambient air embodiment or to the mask in the underwater embodiment and to affix the aforementioned rods and or tubes together.

Moreover, when the wearable action camera is a submersible waterproof camera, as shown in FIG. 28, the present invention 1100 shown with underwater scuba or snorkeling scuba/snorkeling mask 1110 can be used for underwater photography used by persons scuba or snorkeling in the water, where the invention attaches a waterproof underwater action camera 1105 to the scuba/snorkeling mask 1110 or other headgear of a scuba or snorkeling diver, including retainer straps.

For example, as shown in FIG. 28, the submersible, waterproof action camera 1105 and adjacent sunshade shroud enclosure 1102 that protects the viewing screen of the camera 1105 from sun glare reflected in the water, can be separately supported by clamp 1104. The clamp 1104 is connected to the scuba/snorkeling mask 1110 by a cantilevered extension, preferably including a clamp-connected tube 1108, which is itself connected to a hollow elbow tube 1107, which is itself connected by a further hollow tube 1106 to the frame 1111 of the scuba/snorkeling mask 1110 at connection 1109. Mask 1110 may have retainer straps.

Optionally, instead of the tubes 1106, 1108, and elbow tube 1107, the cantilever extension 1101 could be a curved or bent single connecting extension.

The underwater face gear of the diver also includes the diver's nose cover 1112 and mouthpiece 1113 which is connected to the air hose 1114. In the case of a snorkeler, the air hose 1114 has a distal upper end which extends above the water line so that the snorkeler can breathe air through the air hose 1114. In the case of a scuba diver, the scuba air hose 1115 is connected to the oxygen air tank 1116, which is mounted on the back of the diver. In using the underwater embodiment 1100, the eyeball of the diver, viewing forward through the lenses of the scuba/snorkeling mask 1101, in combination with the submersible, waterproof wearable action camera 1105, and the display screen thereof, also jointly and simultaneously move, see, and record in any direction together below the surface under water.

It is also noted that the position of the action cameras 705, 805, 905, 1005, or 1105 can be positioned slightly below the user's line of sight, so that the user has an unobstructed forward view above the location of the action cameras 705, 805, 905, 1005, or 1105 but that the user can still see the screen of the action camera 705, 805, 905, 1005, or 1105 located adjacent to the forward extending glare reducing shroud enclosures 702, 802, 902, 1002, or 1102 whereby the eyeball of the user, in combination with the wearable action camera 705, 805, 905, 1005, or 1105 and said display screen jointly move, see, and record in any direction together.

So far as it is known, there are no mounts or wearables for head wearable action cameras which connect the photographer's eyeball view to the display screen thereof. In the Applicant's present invention, where the head goes, the display screen of the wearable action camera goes. The neck of the photographer has an infinite number of angles for the display screen of the wearable action camera in Applicant's anti-glare apparatuses to document and photograph.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. An apparatus for supporting and using a body worn action camera during physical activity of a user comprising:
    a telescoping member mounted on and extending from an article adapted to be worn on the head of said user;
    said telescoping member comprising an arm having a proximal end thereof attached to said article, and a distal end on which said camera is attached;
    said arm comprising a first tube threadedly attached at a first end to said article and a second end adjustably attached to one leg of an elbow, a second tube have a first end thereof adjustably attached to a second leg of said elbow, and a clamp mounted on a second, free end of said second tube;
    said clamp comprising a base and a pair of spaced side walls extending up from opposite ends of said base, and configured to support between said side walls said camera with a viewing screen thereof facing said article whereby said user has a clear view of said screen, said screen displaying an area being captured by said camera; and
    a truncated, pyramidal shroud enclosure surrounding said viewing screen of said camera, said shroud enclosure having flared top, bottom and side walls shielding said viewing screen from direct sun glare, so that there is a shaded space between the eyes of the user and the viewing screen of said camera;
    whereby an eyeball of the user, in combination with said wearable action camera, and said display screen of said wearable action camera jointly and simultaneously move, see, and record in any direction together.

2. The apparatus of claim 1 in which said elbow is comprised of a hollow tube to receive said first and second tubes, said hollow tube having spaced apertures corresponding with openings in said first and second for using spring loaded, male positioning members on said first and second tubes, for engaging selected spaced apertures in said hollow tube for locating said camera to a position desired by said user.

3. The apparatus of claim 2 in which said article consists of goggles worn during certain sporting activities.

4. The apparatus of claim 3 in which said first tube is threadedly attached to said goggles in a threaded recess in a corner of said goggles located on one side of said goggles.

5. The apparatus of claim 3 in which said first tube is threadedly attached to said goggles in a threaded recess in a top frame of said goggles located above said goggles.

6. The apparatus of claim 2 in which said article consists of a helmet adapted to be worn by said user.

7. The apparatus of claim 6 in which said first tube is threadedly attached to said helmet using a frictional hinge located on a side of said helmet allowing rotation of said first tube for quickly lowering or raising said camera by said user while engaging in a physical activity.

8. The apparatus for supporting and using a body worn action camera during physical activity of a user as in claim 1 further comprising:
    said body worn action camera is a submersible, waterproof action camera;
    said telescoping member, said clamp and said truncated, pyramidal shroud enclosure surrounding said viewing screen of said camera are submersible and waterproof;
    said telescoping member, said clamp and said truncated, pyramidal shroud enclosure are attached to an underwater scuba/snorkeling mask worn by the user; and,
    whereby the eyeball of the user, in combination with said submersible, waterproof wearable action camera, and said display screen jointly and simultaneously move, see, and record in any direction together below the surface under water.

9. A method for supporting and using a body worn action camera during physical activity of a user comprising the steps of:
mounting and extending an arm of a telescoping member on and from an article worn on the head of said user;
attaching a proximal end of said arm of said telescoping member to said article;
attaching said camera to a distal end of said arm;
said arm comprising a first tube threadedly attached at a first end thereof to said article and a second end thereof adjustably attached to one leg of an elbow, and a second tube having a first end thereof adjustably attached to a second leg of said elbow;
mounting a clamp on a second, free end of said second tube;
providing said clamp with a base and a pair of spaced side walls extending up from opposite ends of said base, and configuring said clamp to support between said side walls said camera with a viewing screen thereof facing said article whereby said user has a clear view of said screen, said screen displaying an area being captured by said camera;
placing a truncated, pyramidal shroud enclosure around said viewing screen of said camera, said shroud enclosure having flared top, bottom and side walls shielding said viewing screen from direct sun glare, so that there is a shaded space between the eyes of the user and the viewing screen of said camera; and
said user engaging in a sports activity while wearing said action camera, watching said screen in real time, and adjusting the position of said action camera while in motion.

10. The method of claim 9 in which said elbow is comprised of a hollow tube to receive said first and second tubes, said hollow tube having spaced apertures corresponding with spaced openings in said first and second tube for using spring loaded, male positioning members on said first and second tubes, for engaging selected spaced apertures in said hollow tube for locating said camera to a position desired by said user.

11. The method of claim 10 in which said article consists of goggles worn during certain sporting activities.

12. The method of claim 11 in which said first tube is threadedly attached to said goggles in a threaded recess in a corner of said goggles located on one side of said goggles.

13. The method of claim 11 in which said first tube is threadedly attached to said goggles in a threaded recess in a top frame of said goggles located above said goggles.

14. The method of claim 10 in which said article consists of a helmet being worn by said user.

15. The method of claim 14 in which said first tube is threadedly attached to said helmet using a frictional hinge located on a side of said helmet, said user rotating said first tube for quickly lowering or raising said camera while engaging in said sports activity.

16. The method for supporting and using a body worn action camera during physical activity of a user as in claim 9 further comprising:
said body worn action camera is a submersible, waterproof action camera;
said telescoping member, said clamp and said truncated, pyramidal shroud enclosure surrounding said viewing screen of said camera are submersible and waterproof; said telescoping member, said clamp and said truncated, pyramidal shroud enclosure are attached to an underwater scuba/snorkeling mask worn by the user; and,
whereby the eyeball of the user, in combination with said submersible, waterproof wearable action camera, and said display screen jointly and simultaneously move, see, and record in any direction together below the surface under water.

17. An apparatus for supporting and using a body worn action camera during physical activity of a user comprising:
a telescoping member mounted on and extending from an article adapted to be worn on the head of said user;
said telescoping member comprising an arm having a proximal end thereof attached to said article, and a distal end on which said camera is attached;
said arm comprising a cantilevered extension attached at a first end to said article and a second end adjustably attached a clamp mounted on a second, free end of said cantilevered extension;
said clamp configured to support said camera with a viewing screen thereof facing said article whereby said user has a clear view of said screen, said screen displaying an area being captured by said camera; and
a longitudinally and axially extending opaque hollow enclosure surrounding said viewing screen of said camera having flared top, bottom and side walls shielding said viewing screen from direct sun glare, so that there is a shaded space between the eyes of the user and the viewing screen of said camera;
whereby an eyeball of the user, in combination with said wearable action camera, and said display screen of said wearable action camera jointly and simultaneously move, see, and record in any direction together.

18. The apparatus as in claim 17 wherein said body worn action camera is a submersible, waterproof action camera;
said cantilevered telescoping member, said clamp and said opaque hollow enclosure surrounding said viewing screen of said camera are submersible and waterproof;
said telescoping member, said clamp and said opaque hollow shroud enclosure are attached to an underwater scuba/snorkeling mask worn by the user; and,
whereby the eyeball of the user, in combination with said submersible, waterproof wearable action camera, and said display screen jointly and simultaneously move, see, and record in any direction together below the surface under water.

19. A method for supporting and using a body worn action camera during physical activity of a user comprising the steps of:
mounting a telescoping member on and extending from an article adapted to be worn on the head of said user;
said telescoping member comprising an arm having a proximal end thereof attached to said article, and a distal end on which said camera is attached;
said arm comprising a cantilevered extension attached at a first end to said article and a second end adjustably attached a clamp mounted on a second, free end of said cantilevered extension;
configuring said clamp to support said camera with a viewing screen thereof facing said article whereby said user has a clear view of said screen, said screen displaying an area being captured by said camera; and
surrounding said viewing screen of said camera with a longitudinally and axially extending opaque hollow enclosure and shielding said viewing screen from direct sun glare, so that there is a shaded space between the eyes of the user and the viewing screen of said camera;

whereby an eyeball of the user, in combination with said wearable action camera, and said display screen of said wearable action camera jointly and simultaneously move, see, and record in any direction together.

* * * * *